(12) United States Patent
Angibaud et al.

(10) Patent No.: US 12,544,141 B2
(45) Date of Patent: Feb. 10, 2026

(54) COMPUTER-BASED PLATFORMS FOR IMPLEMENTING A WEIGHT-BASED PERSONALIZED IMPLANT PLANNING DURING A TOTAL JOINT ARTHROPLASTY AND METHODS OF USE THEREOF

(71) Applicant: Advita Ortho, LLC, Gainesville, FL (US)

(72) Inventors: Laurent Angibaud, Gainesville, FL (US); Cyril Hamad, Meylan (FR); Prudhvi Chinimilli, Milpitas, CA (US); Florian Kerveillant, Grenoble (FR); James Huddleston, Woodside, CA (US)

(73) Assignee: Advita Ortho, LLC, Gainesville, FL (US)

( * ) Notice: Subject to any disclaimer, the term of this patent is extended or adjusted under 35 U.S.C. 154(b) by 0 days.

(21) Appl. No.: 19/205,207

(22) Filed: May 12, 2025

(65) Prior Publication Data
US 2025/0352270 A1    Nov. 20, 2025

Related U.S. Application Data

(60) Provisional application No. 63/647,491, filed on May 14, 2024.

(51) Int. Cl.
*A61B 34/10* (2016.01)
*A61B 34/00* (2016.01)

(52) U.S. Cl.
CPC ............ *A61B 34/10* (2016.02); *A61B 34/25* (2016.02); *A61B 2034/102* (2016.02); *A61B 2034/107* (2016.02); *A61B 2034/108* (2016.02); *A61B 2034/256* (2016.02)

(58) Field of Classification Search
CPC ... A61B 34/10; A61B 34/25; A61B 2034/102; A61B 2034/107; A61B 2034/108; A61B 2034/256
See application file for complete search history.

(56) References Cited

U.S. PATENT DOCUMENTS

2025/0152241 A1*  5/2025  Favre .................... A61B 34/00

* cited by examiner

*Primary Examiner* — Samuel S Hanna
(74) *Attorney, Agent, or Firm* — GREENBERG TRAURIG, LLP

(57) ABSTRACT

A method and system for personalized implant planning during total joint arthroplasty include obtaining a plurality of patient-specific data prior to an implantation of at least one implant into a joint of a patient comprising a first bone member and a second bone member; inputting the plurality of patient-specific data into at least one weight-based implant algorithm, at least one weight-based implant machine learning model, or both, configured to output weights assigned to patient-specific functional parameters that facilitate a prioritization for each of the patient-specific functional parameters; utilizing a surgical plan model to obtain a patient-specific intra-operative surgical plan for the implantation of the at least one implant, based at least in part on the plurality of patient-specific data, intra-operative patient-specific data, the plurality of patient-specific functional parameters, and/or the plurality of weights; and performing the implantation based on the patient-specific intra-operative surgical plan.

27 Claims, 17 Drawing Sheets

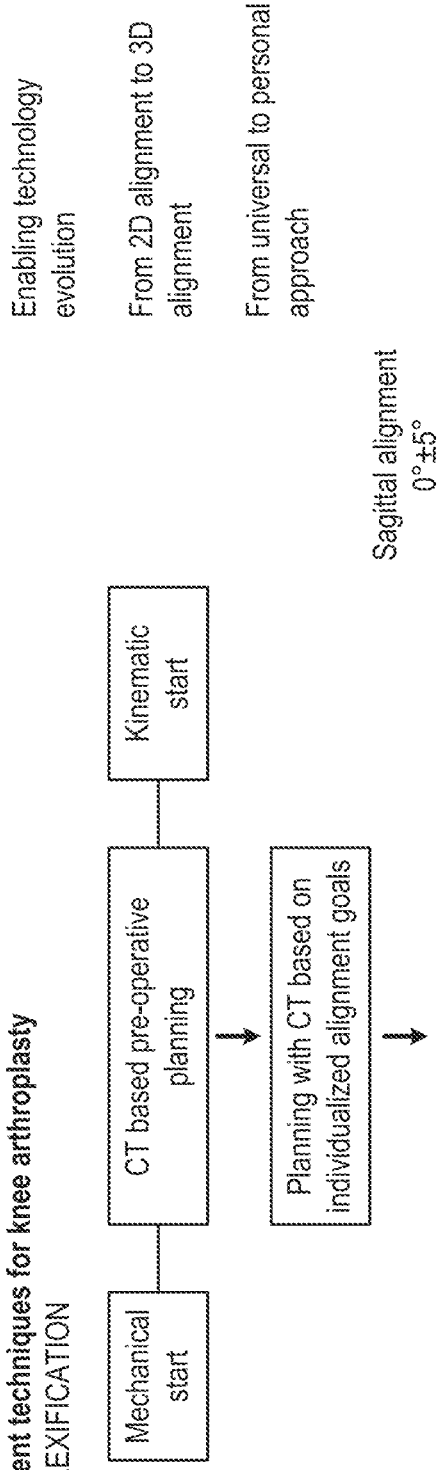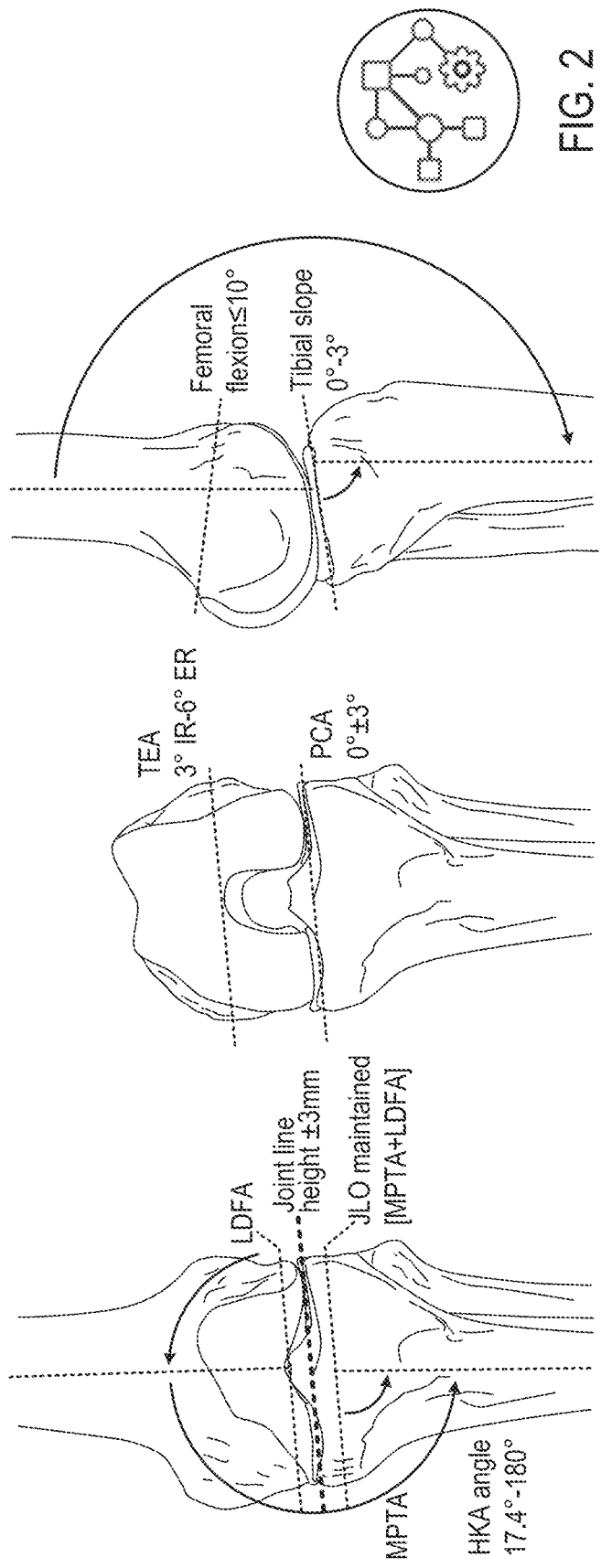
FIG. 2

375

Algorithm: Functional parameters optimization model (FPOM) training using batch gradient descent i. Input: training set $(x_1, y_1), (x_2, y_2), \ldots, (x_t, y_t), \ldots, (x_T, y_T)$, where $x_i \in X, y_i \in Y$ and $t$ is the number of surgery planning cases available from specific surgeon. $X$ and $Y$ represent training inputs and training outputs, respectively. $X$ includes inputs one or many related to alignment functional parameters (FPs) $A_1, A_2, \ldots A_M$, size functional parameters $S_1, S_2, \ldots S_N$, laxity functional parameters $L_1, L_2, \ldots L_P$, surgical workflow category $SW$, patient inputs such as $P_1, P_2, \ldots P_Q$. $Y$ includes target and acceptable functional parameters thresholds for each functional parameter. For each FP, there are four thresholds defined target minimum threshold ($FP_T^{min}$), target maximum threshold ($FP_T^{max}$), acceptable minimum threshold ($FP_A^{min}$), acceptable maximum threshold ($FP_A^{max}$). Parameters for the optimization algorithm: learning rate ($\alpha$), convergence criteria ($\epsilon$), and maximum number of iterations ($Max_{iter}$)

ii. Initialization:
 1. Weights corresponding to three fields of interest alignment $(w_a^i)$, size $(w_s^i)$, and laxity $(w_l^i)$ are initialized. $w_a = w_a^i, w_s = w_s^i, w_l = w_l^i$. The weights are initialized ensuring two weight constraints: a) $w_a, w_s, w_l \geq 0$ and b) $w_a + w_s + w_l = 1$
 2. Initialize iteration counter: $iter = 0$
 3. Initialize previous global error: $Err_{prev} = \infty$ iii. Iteration: While $iter < Max_{iter}$ and $|Err_{prev} - Err_{curr}| > \epsilon$
 1. Increment iteration counter $iter = iter + 1$
 2. Computes current global error $Err_{curr}$ using the current weights and all training examples. The implant fit method computes all possible implant plannings for each training example. Over the space of all available implant plannings, the global error for each training example is calculated by considering fitted FPs with respect to target thresholds and acceptable thresholds. Then, all training global errors are averaged to compute current global error $Err_{curr}$
 3. Compute gradients of $Err_{curr}$ $\{\frac{\partial E}{\partial w_a}, \frac{\partial E}{\partial w_s}, \frac{\partial E}{\partial w_l}\}$ with respect to $w_a, w_s,$ and $w_l$ using all training samples
 4. Update weights using the average gradient over all training samples
    - $w_a = w_a - \alpha \frac{\partial E}{\partial w_a}$
    - $w_s = w_s - \alpha \frac{\partial E}{\partial w_s}$
    - $w_l = w_l - \alpha \frac{\partial E}{\partial w_l}$
 5. Update $Err_{prev} = Err_{curr}$ iv. Output: Return final optimized weights $w_a^f, w_s^f, w_l^f$

FIG. 9

Historical Algorithm

| Surgeon/Parameter | Distal medial CH | Distal lateral CH | Posterior medial CH | Posterior lateral CH | Notching | Varus | Rotation | Flexion | Size | Sum clicks |
|---|---|---|---|---|---|---|---|---|---|---|
| Surgeon1 (N=71) | 1.44 | 1.63 | 3.03 | 3.03 | 0.79 | 1.82 | 0.04 | 2.76 | 0.04 | 14.56 |
| Surgeon2 (N=109) | 1.46 | 1.92 | 1.25 | 1.49 | 0.06 | 2.72 | 1.74 | 1.69 | 0.06 | 12.40 |
| Surgeon3 (N=35) | 1.91 | 2.86 | 2.11 | 5.18 | 0.60 | 2.63 | 2.34 | 2.77 | 0.23 | 18.62 |
| Surgeon4 (N=21) | 1.57 | 1.81 | 3.05 | 2.43 | 0.52 | 1.33 | 0.66 | 1.33 | 0.14 | 13.04 |
| Surgeon5 (N=31) | 1.35 | 0.90 | 2.13 | 1.81 | 0.23 | 1.52 | 0.87 | 1.58 | 0 | 10.39 |
| Surgeon6 (N=46) | 1.33 | 2.24 | 1.15 | 1.13 | 0.07 | 1.91 | 0 | 0.70 | 0.04 | 8.57 |
| Mean clicks | 1.51 | 1.89 | 2.12 | 2.18 | 0.38 | 1.99 | 0.98 | 1.8 | 0.09 | 12.93 |

FIG. 11A

Laxity-based Planning Algorithm

| Surgeon/Parameter | Distal medial CH | Distal lateral CH | Posterior medial CH | Posterior lateral CH | Notching | Varus | Rotation | Flexion | Size | Sum clicks |
|---|---|---|---|---|---|---|---|---|---|---|
| Surgeon1 (N=71) | 1.04 | 1.13 | 0.90 | 0.92 | 0.75 | 1.02 | 0.17 | 1.95 | 0.17 | 8.12 |
| Surgeon2 (N=109) | 1.24 | 1.27 | 0.99 | 1.40 | 0.06 | 1.50 | 1.44 | 1.82 | 0.16 | 10 |
| Surgeon3 (N=35) | 0.69 | 0.60 | 0.74 | 0.66 | 0.31 | 0.51 | 0.66 | 1.37 | 0 | 5.54 |
| Surgeon4 (N=21) | 1.10 | 1.57 | 1.19 | 1.29 | 0.52 | 0.90 | 0.86 | 1.33 | 0 | 8.76 |
| Surgeon5 (N=31) | 0.71 | 1.36 | 1.29 | 1.16 | 0.23 | 1.45 | 0.87 | 1.29 | 0.10 | 8.45 |
| Surgeon6 (N=46) | 1 | 1.02 | 1 | 1.13 | 0.07 | 0.87 | 0.04 | 1.54 | 0.17 | 6.84 |
| Mean clicks | 0.96 | 1.16 | 1.02 | 1.10 | 0.33 | 1.04 | 0.67 | 1.57 | 0.10 | 7.95 |

FIG. 11B

% Reduction clicks

| Surgeon/Parameter | Sum clicks (historical) | Sum clicks (laxity) | Sum clicks (reduction%) |
|---|---|---|---|
| Surgeon1 (N=71) | 14.56 | 8.12 | 44.3% |
| Surgeon2 (N=109) | 12.40 | 10 | 19.4% |
| Surgeon3 (N=35) | 18.62 | 5.54 | 70.2% |
| Surgeon4 (N=21) | 13.04 | 8.76 | 32.8% |
| Surgeon5 (N=31) | 10.39 | 8.45 | 18.7% |
| Surgeon6 (N=46) | 8.57 | 6.84 | 20.2% |
| Mean clicks | 12.93 | 7.95 | 38.5% |

COMPUTER-BASED PLATFORMS FOR IMPLEMENTING A WEIGHT-BASED PERSONALIZED IMPLANT PLANNING DURING A TOTAL JOINT ARTHROPLASTY AND METHODS OF USE THEREOF

FIELD OF TECHNOLOGY

The present disclosure generally relates to orthopedic surgery, and, in at least some embodiments, to an illustrative computer-based platform for implementing a weight-based personalized implant planning during a total joint arthroplasty and methods of use thereof.

BACKGROUND OF TECHNOLOGY

The most common total joint replacement procedures in the U.S. are total knee replacements (approximately 790,000 a year) and total hip replacements (approximately 450,000 a year). Although joint replacement surgeries are typically associated with remarkable outcomes, it has been reported that at least a significant portion of patients (e.g., up to 20% or more) may not be satisfied with their clinical outcomes. While this situation may be due to many factors, such as patient expectations, it has been reported that surgical technique used by the surgical staff may play an important role in determining successful clinical outcomes. Similarly, despite the high survivorship of total joint replacements (e.g., more than 95% at 10 years), early revisions for joint instability or joint stiffness, for example, seems to be a primary factor due to intra-operative technical errors and/or inability to properly define the personalized cut parameters during the set-up of patient-based surgical planning. Thus, there may be a need in the art for surgical approaches in reducing intra-operative technical errors and for personalizing the definition of a surgical plan.

SUMMARY

In some embodiments, the present disclosure provides an exemplary technically improved computer-based method that includes at least the following steps of obtaining a plurality of patient-specific data values prior to an implantation of at least one implant into a joint of a patient comprising a first bone member and a second bone member; inputting the plurality of patient-specific data values into at least one weight-based implant algorithm, at least one weight-based implant machine learning model, or both, configured to output a plurality of weights assigned to a plurality of patient-specific functional parameters that facilitate a patient-specific functional parameter prioritization for the plurality of patient-specific functional parameters; utilizing a surgical plan model to obtain a patient-specific intra-operative surgical plan for the implantation of the at least one implant, based at least in part on the plurality of patient-specific data values, the plurality of patient-specific functional parameters, and the plurality of weights; where the patient-specific intra-operative surgical plan includes at least one surgical parameter based on the patient-specific functional parameter prioritization; initiating a surgical procedure for the implantation based on the patient-specific intra-operative surgical plan; inputting, during the surgical procedure, a plurality of intra-operative patient-specific data values into the at least one weight-based implant algorithm, the at least one weight-based implant machine learning model, or both, to generate a plurality of updated weights and an updated patient-specific functional parameter prioritization for the plurality of patient-specific functional parameters; inputting, during the surgical procedure, the plurality of updated weights, the plurality of intra-operative patient-specific data values and the updated patient-specific functional parameter prioritization to the surgical plan model to obtain an updated patient-specific intra-operative surgical plan having at least one updated surgical parameter; and preparing the first bone member, the second bone member, or both during the surgical procedure based on the updated patient-specific intra-operative surgical plan to complete the implantation of the at least one implant.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 2 illustrates a complexification of the joint replacement techniques for functional alignment for Total Knee Arthroplasty (TKA) in accordance with one or more embodiments of the present invention;

FIG. 9 illustrates pseudo code for a functional parameters optimization model (FPOM) training using batch gradient descent optimization that considers three fields of interest of alignment, size, and laxity in accordance with one or more embodiments of the present invention;

FIGS. 11A-11C are tables illustrating the difference in the number of adjustment clicks needed by the surgeon when employing a historical algorithm versus a laxity-based planning algorithm in accordance with one or more embodiments of the present invention;

DETAILED DESCRIPTION

Figure 1:
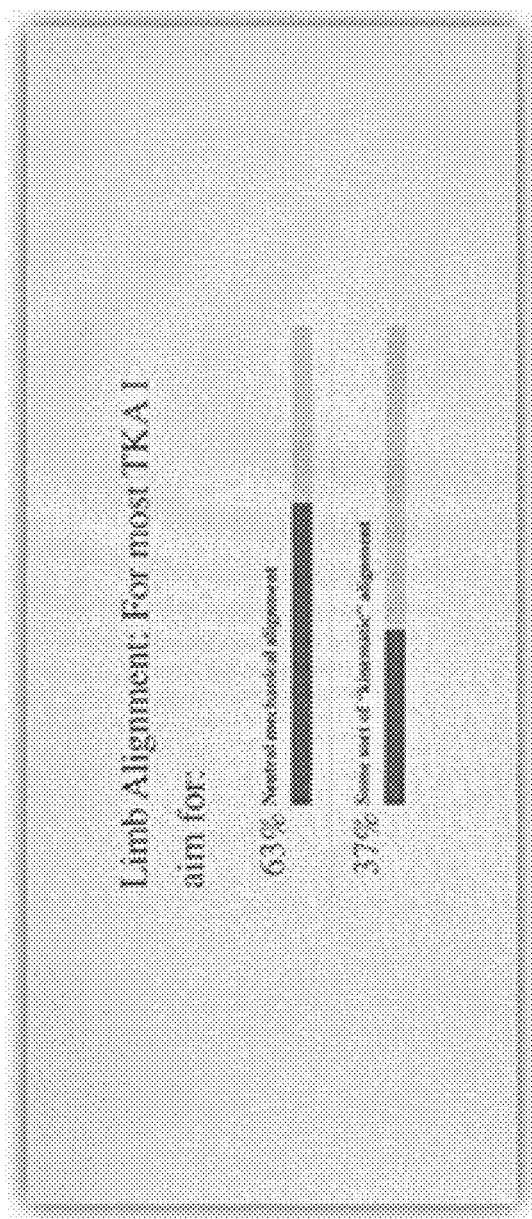
FIG. 1 illustrates an adoption among surgeons of kinematic alignment (KA)

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

Over the past few years, there was a clear and dynamic evolution of the surgical technique from a systematic workflow based on solely alignment considerations to a personalized workflow where alignment may be de-emphasized as soft-tissue considerations may be added and considered. As a result, the adoption of such personalized surgical workflow has gained tremendous adoption recently. Specifically, FIG. 1 illustrates an adoption among surgeons of kinematic alignment (KA) increased from 14% in 2021 to 37% in 2022.

However, despite this clinical evolution, algorithms may be used for the set-up of the surgical planning may still be fueled by bony references and alignment references instead of expected soft tissue references. As a result of this discrepancy between the intent of the algorithms and the expectations from the surgeons during surgery, there may be a need in the art to implement a large number of changes to update the planning defined by the algorithm using bony references to an optimal planning preferred by the surgeon leveraging soft-tissue considerations.

Most recent personalized workflows tend to more complex (e.g., 3D instead of traditional 2D approach, dynamic acquisition throughout the arc of flexion instead of traditional static acquisition at defined angle) leading to an added number of data to be processed, longer learning curve, and longer duration of the surgery.

FIG. 1 illustrates a complexification of the joint replacement techniques for functional alignment for Total knee arthroplasty (TKA). Between obsolete algorithms that may be used to define surgical planning and the continuous complexification of the surgical workflow that may be used during joint replacement procedures, there may be a need to develop augmented algorithms to be able to generate surgical planning based on the processing of inputs of interest.

In at least some aspects of at least some embodiments of the present disclosure herein are directed to systems and methods for the self-generation of a surgical planning that may be used in a replacement of a joint using weight-based models. At least one principle to implement the systems and methods as described in this disclosure may use at least one aspect of at least one embodiment described in U.S. Pat. No. 12,239,384, which is incorporated herein by reference.

Figure 3:
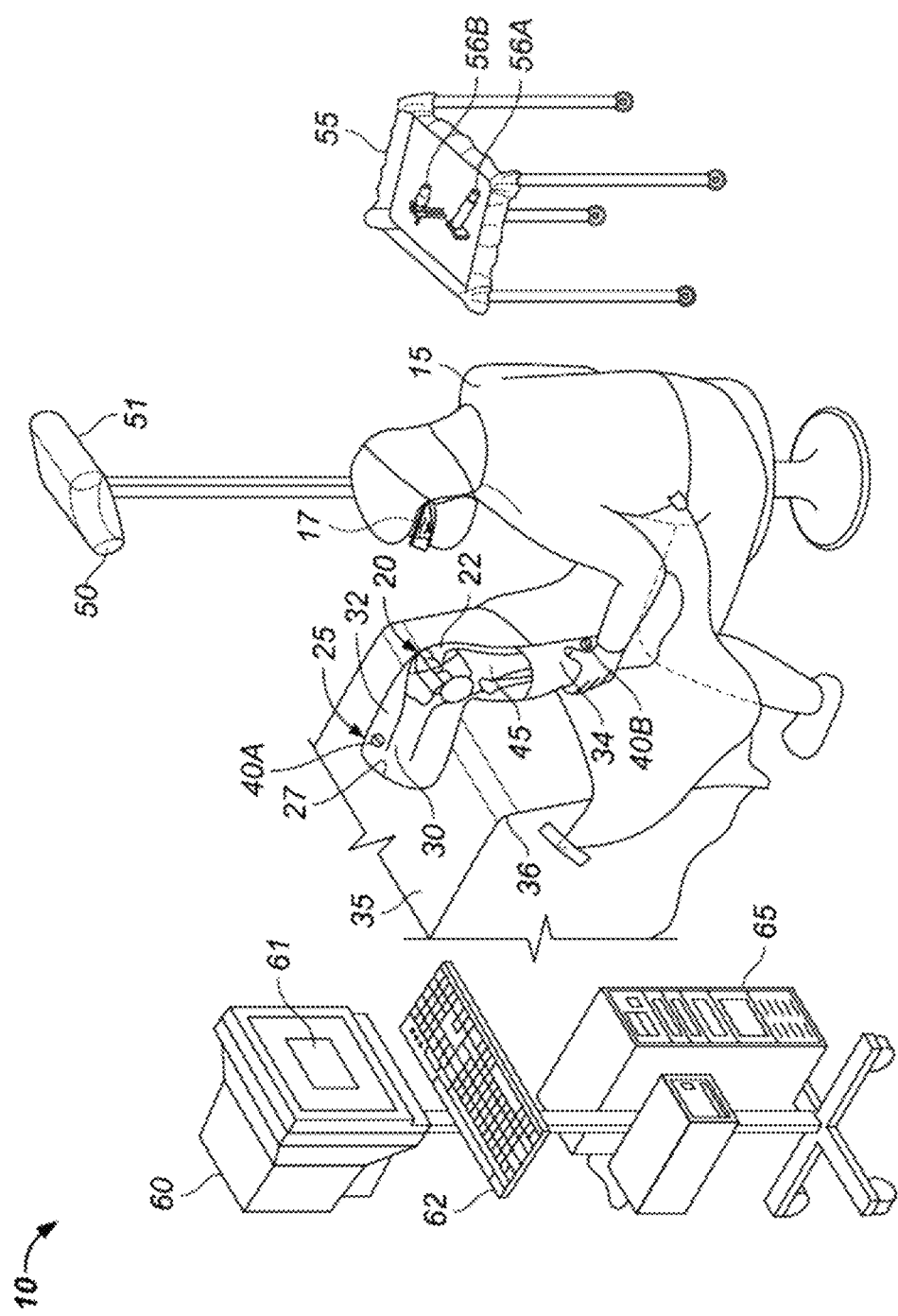
FIG. 3 schematically illustrates an operating room using an improved computer-based platform for implant planning during a total joint arthroplasty in accordance with one or more embodiments of the present invention.

FIG. 3 schematically illustrates an operating room 10 using an improved computer-based platform for implant planning during a total joint arthroplasty in accordance with one or more embodiments of the present disclosure. The embodiments shown in FIG. 3 refer to a total knee arthroplasty procedure. FIG. 3 shows a surgeon 15 operating on a leg 25 of a patient positioned on an operating table 35. The leg 25 of the patient may be placed through a surgical drape opening 27 for access to the leg 25 by the surgeon 15. In this exemplary embodiment, the surgeon 15 may perform a total knee arthroplasty procedure on the patient via an incision 22 made by the surgeon 15 to expose a knee joint 20 of the patient. The leg 25 as shown in FIG. 3 may include an upper portion 32 (e.g., a first member-thigh) with a femur 30 (e.g., first bone member), a lower portion 34 (e.g., a second member-calf) with a tibia 45 (e.g., second bone member), and the knee joint 20.

In some embodiments, at least one first tracking device 40A may be coupled to the upper portion 32 of the leg 25 (e.g., a first bone member) and at least one second tracking device 40B (e.g., a second bone member) may be coupled to the lower portion 34 of the leg 25. In other embodiments, the at least one first tracker 40A and the at least one second tracker 40B may be rigidly mounted to the bone members (e.g., respectively to the femur 30 and to the tibia 45 for the embodiments of FIG. 3).

In some embodiments, the operating room 10 may include at least one imaging camera 50 shown schematically in FIG. 3 mounted on an image camera assembly 51. Note that any suitable number of cameras of any suitable type may be mounted on the image camera assembly 51 that may be used to track 3D objects. The at least one imaging camera 50 may be used to acquire a position and/or orientation of the bone members in a three-dimensional (3D) environment.

In some embodiments, the operating room 10 may include at least one surgical tool 56A and/or at least one surgical probe 56B placed on a cart 55 easily accessible by the surgeon 15 during the total joint arthroplasty procedure.

In some embodiments, the operating room 10 may include a controller 65, a keyboard 62 and a display 60 displaying a graphic user interface (GUI) 61.

Note that the display 60 displaying the GUI 61 may also be referred to herein as a surgery assistant device.

In some embodiments, the display 60 may be a screen/monitor directly accessible to the surgeon 15 and/or by a wearable display 17 (e.g., heads up display, smart glasses) directly worn by the surgeon 15 during the surgical procedure so as to provide a computer-controlled augmented reality view for the surgeon 15. The controller 65 may be communicatively coupled to any of the surgical tools used by the surgeon 15 to perform the total joint arthroplasty.

In some embodiments, the controller 65 may display on the GUI 61 of the display 60 (e.g., a surgery assistance device), a surgical plan to assist the surgeon 15 to perform the placement of the joint implant into the joint of the patient undergoing the total joint arthroplasty. The keyboard 62 may be used by the surgeon 15 or any other medical personnel assisting the surgeon 15 to input patient-specific data into the controller 65 via the keyboard 62 either before and/or during and/or after the total joint arthroplasty procedure such that the algorithms executed by the controller 65 may generate and/or update the surgical plan in real time so as to assist the surgeon 15 before and/or during the total joint arthroplasty procedure.

In some embodiments, the controller 65 (e.g., the I/O devices 92) may be configured to receive voice control commands and/or the display unit 60 may have touchscreen capabilities as an alternative to using the keyboard 62, where the surgeon 15 may use a pointer device, (e.g., an input device 92), for example, to activate graphical user interface elements on the GUI 61 that are programmed to allow the surgeon 15 to adjust surgical parameters via the display unit 60 during the surgical procedure, as will be shown hereinbelow.

In some embodiments not shown in FIG. 3, the controller 65 may be configured to control a surgical robotic assembly that may be used to perform the total joint arthroplasty robotically.

Figure 4:
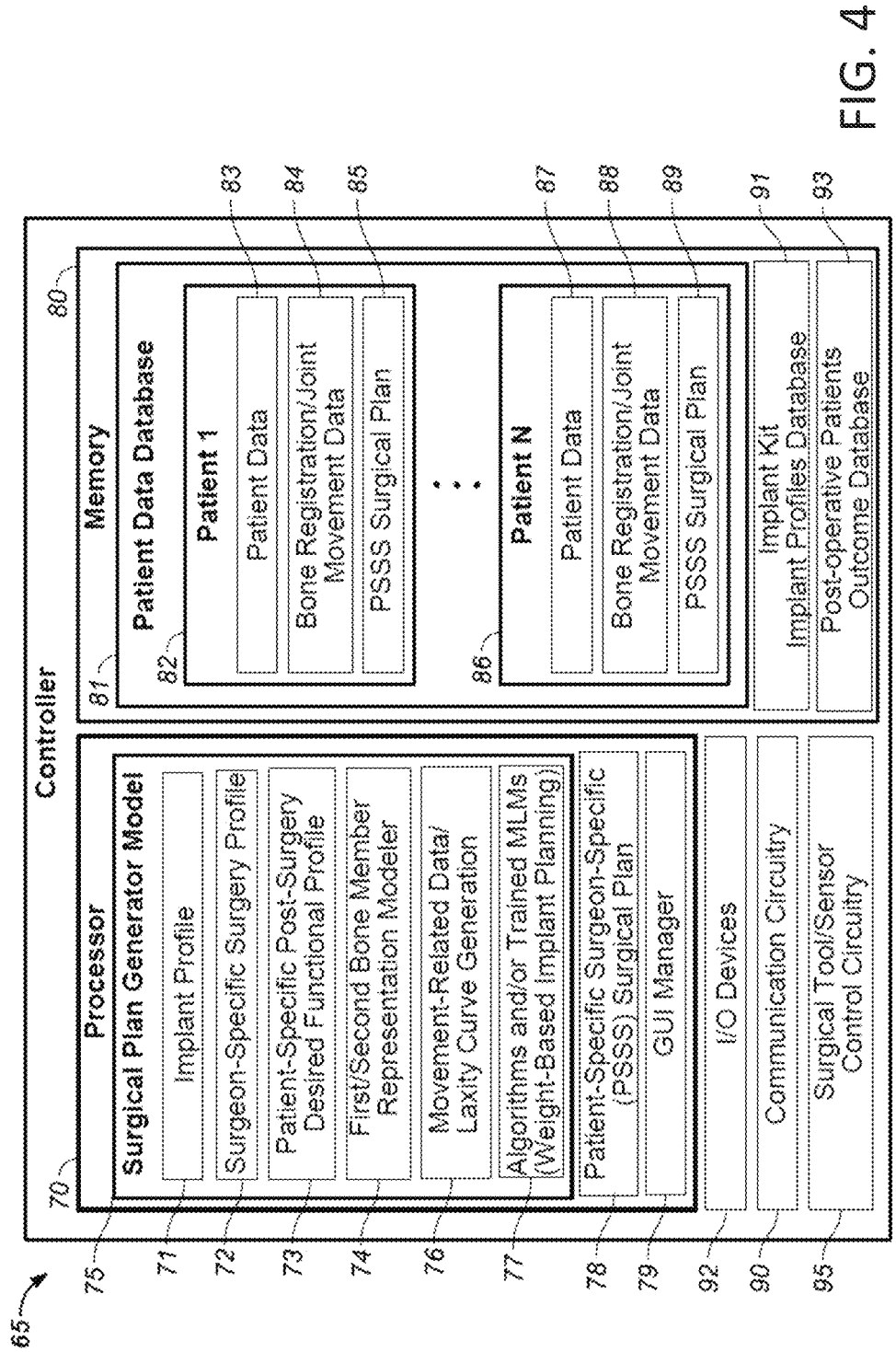
FIG. 4 is a block diagram of a controller of an improved computer-based platform for implementing a weight-based personalized implant planning during a total joint arthroplasty in accordance with one or more embodiments of the present invention.

FIG. 4 is a block diagram of the controller 65 of an improved computer-based platform for implementing a weight-based personalized implant planning during a total joint arthroplasty in accordance with one or more embodiments of the present disclosure. The controller 65 of a computer assisted orthopedic system (CAS) represented in FIG. 3 may include a processor 70, a memory 80, input and output devices 92 such as the display 60 and the keyboard 62, a communication circuitry 90, and a surgical tool and sensor control circuitry 95. The communication circuitry 90 may enable the controller 65 to communicate with other computing devices over any suitable wired and/or wireless communication network. The communication circuitry 90 may be enabled by the controller 65 to communicate with the at least one surgical tool 56A and/or with the at least one surgical probe 56B, and/or the at least one imaging camera 50 and/or with the at least one first tracker 40A and/or the at least one second tracker 40B.

In some embodiments, the surgical tool and sensor control circuitry 95 may be configured to process sensor signals from the at least one surgical tool 56A and the at least one surgical probe 56B, and/or the at least one imaging camera 50 and/or with the at least one first tracker 40A and/or the at least one second tracker 40B, and/or for any other suitable surgical devices and/or sensors needed to perform the total joint arthroscopy procedure. In other embodiments, the surgical tool and sensor control circuitry 95 may be configured to receive commands from the processor 70. The commands may be used to control the at least one surgical tool 56A and the at least one surgical probe 56B during surgery, and/or to control a robotic surgical apparatus for performing the surgical total joint arthroscopy procedure in the operating room 10.

In some embodiments, the processor 70 may be configured to execute a surgical plan generator model 75 (also referred to as a surgical plan model 75) that may include a software module 77 of algorithms, trained machine learning model (MLM), or both. The Software module 77 may include at least one weight-based implant planning algorithm as shown hereinbelow. The algorithms may be used for generating and/or updating the surgical plan in real time so as to assist the surgeon 15 before and/or during the total joint arthroplasty procedure. The surgical plan generator model 75 may use as inputs to the algorithm/MLM software module 77: an implant profile 71, a surgeon-specific surgery profile 72, and a patient-specific post-surgery desired functional profile 73. The surgical plan generator model 75 may use a first and second bone member representation modeler 74, and a Movement-Related Data/Laxity curve generation software module 76. The processor executing the surgical plan generator model 75 may output a Patient-Specific Surgeon-Specific (PSSS) Surgical plan 78 based at least on part on the weight-based implant planning algorithms. A GUI manager software module 79 may be configured to transmit instructions to the display 60 so as to display the PSSS Surgical Plan 78 on the GUI 61 for the surgeon 15 to view before and/or during the arthroplasty surgical procedure. All or any of the above software routines may be stored in the memory 80.

In some embodiments, any of the datasets described hereinbelow may be used to build training datasets with specific input data vectors and specific output data vectors that may be used to train machine learning models 77. Thus, the trained machine learning model 77 may be used to specifically map the input data vector to the output data vectors.

In some embodiments, the memory 80 may be configured to store a patient data database 81 storing the data from N patients, where N is an integer. The patient data database 81 may include a patient record 82 of patient 1 that includes for patient 1, patient data 83, bone registration/joint movement data 84, and a PSSS surgical plan 85. The patient data database 81 may include a patient record 86 of the Nth patient N that includes for patient N, patient data 87, bone registration/joint movement data 88, and a PSSS surgical plan 89. The memory 80 may be configured to store data for an implant kit in an implant profiles database 91, and a post-operative patients outcome database 93. The implant profiles database 91 may store a plurality of implant profiles. The post-operative patients outcome database 93 may store a plurality of patient outcome data for patients having had a plurality of arthroplasty surgical procedures.

Figure 5A:
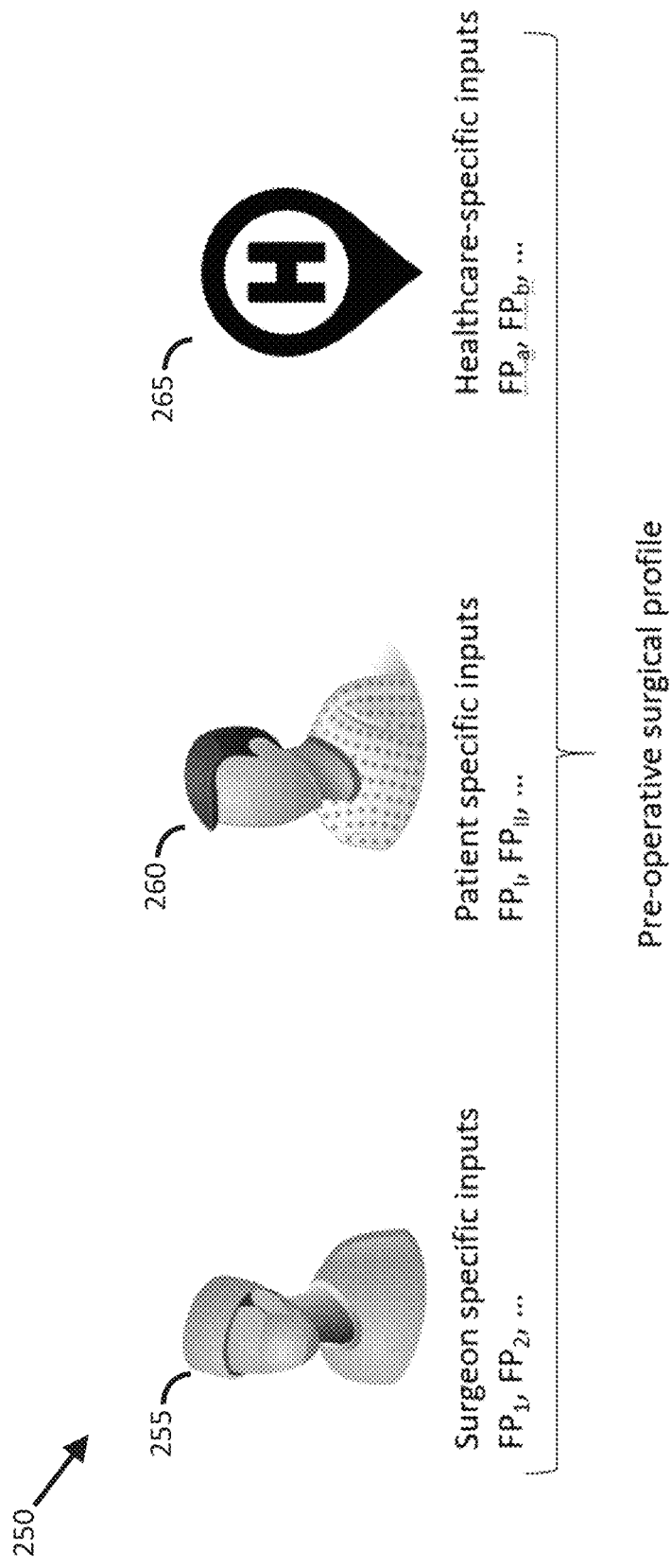
FIG. 5A illustrates different inputs for a pre-operative surgical profile in accordance with one or more embodiments of the present invention.

FIG. 5A illustrates different inputs 250 for a pre-operative surgical profile in accordance with one or more embodiments of the present disclosure. Some of the above-mentioned sets of the pre-operative inputs may be used independently or in combination, while others may be considered as being optional. The association of these sets of pre-operative inputs may generate a dedicated, pre-operative surgical profile based on surgeon-specific inputs 255, patient-specific inputs 260, and/or healthcare-specific inputs 265. The set of surgeon-specific inputs may be represented herein as $\{FP_1, FP_2 \ldots\}$. The set of patient-specific inputs may be represented herein as $\{FP_I, FP_{II} \ldots\}$. The set of healthcare-specific inputs may be represented herein as $\{FP_a, FP_b \ldots\}$.

In some embodiments, the pre-operative surgical profile may be stored in the memory 80 of the controller 65 associated with a CAS technology to be used during a surgery.

In some embodiments, the surgery may use CAS technology as shown in the operating room 10 (FIG. 3) using an improved computer-based platform for implant planning during a total joint arthroplasty, as well as surgical instruments where the at least one surgical tool 56A may include a tensor, or a distractor, to distract the soft-tissue for laxity acquisition.

In some embodiments, at the time of the surgery, the CAS technology may be used to characterize the considered joint as defined by a set of intra-operative inputs including, but not limited to, data associated with the size of at least one implant, data associated with angular alignment of the of at least one implant, and/or data associated with soft-tissue in terms of gaps defined as the distance between a first bone and a second bone, or in terms of laxity defined as a differential between gaps (e.g., differential between the lateral compartment gap and medial compartment gap).

Figure 5B:
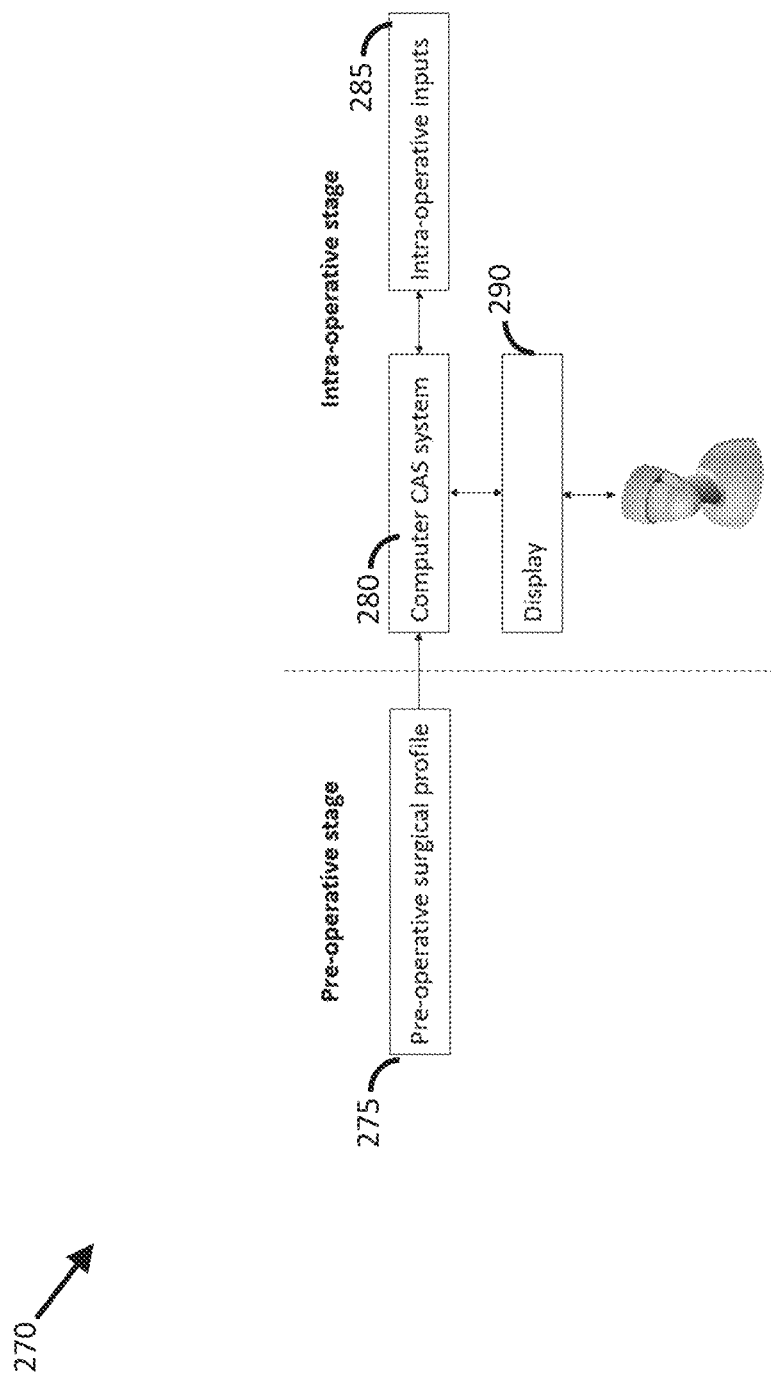
FIG. 5B illustrates a surgical flow combining both a pre-operative stage and intra-operative stage in accordance with one or more embodiments of the present invention.

FIG. 5B illustrates a surgical flow 270 combining both a pre-operative stage and intra-operative stage in accordance with one or more embodiments of the present disclosure. The pre-operative stage may include processor 70 acquiring a pre-operative surgical profile 275. The intra-operative stages may include the controller 65 of the computer CAS system 280 receiving the pre-operative surgical profile 275. The computer CAS system 280 may be controlled using the controller 65. Both the pre-operative surgical profile 275 and intra-operative inputs 285 may be combined to feed the algorithm and/or trained machine learning models 77 in the surgical plan generator model 75 of FIG. 4, which may output an updated PSSS surgical plan 78 from the surgical plan generator 75 on a display 290 (e.g., GUI 61 on the display 60 of FIG. 1) to display for the surgeon 15, and may include the subsequent steps to be performed during the surgery.

In some embodiments, the parameters and data shown in FIGS. 5A and 5B may be inputs that are inputted into the surgical plan generator model 75 to generate the patient-specific surgeon-specific surgical plan 78.

Note that the patient-specific surgeon-specific surgical plan (PSSS) may also be used interchangeably with a "patient-specific surgical plan" or a "patient-specific intra-operative surgical plan" (e.g., the output of the surgical plan model 75).

In some embodiments, a plurality of inputs to the surgical plan generator model 75 may include, but are not limited to an implant profile of the implant chosen from the plurality of implants, the first range of surgeon-specific surgery guidance values for each of the plurality of surgical parameters, the at least one functional parameter value for the at least one functional parameter representative of the expected functional performance of the joint after the implantation, the first and the second bone member representations, the movement-related data for acquiring the laxity curves, and/or a plurality of weights as will be described hereinbelow.

In some embodiments, the personalized surgical planning may leverage at least patient-based set of inputs as well as surgeon-based sets of inputs, where the patient-based set of inputs may include at least one of the following inputs associated with a field of interest:

A first set of patient data linked with a first field of interest (e.g., Anatomical landmarks may be sufficient to define an alignment of the joint), A second set of patient data linked with a second field of interest (e.g., Anatomical landmarks may be sufficient to define the dimensional size of the bone members associated with the joint), A third set of patient data linked with a third field of interest (e.g., Set of soft-tissue information may be sufficient to be able to define the laxity of the joint), or More generally, a "n" set of patient data linked with a "n" field of interest (Depending on the considered joint, numerous specific fields of interest may be defined).

In some embodiments, other optional input(s) may include, such as for example, but not limited to at least one of:

Demographic,

Geographic area,

Activity level (Expectation of), or

Deformity of the joint.

In some embodiments, the surgeon-based set of input may include at least one of the following sets of surgical variables (SV) associated with a field of interest:

A first set of surgical variables linked with a first field of interest; where for each surgical variable from the first set of surgical variables, there exists a range of acceptable value ideally defined by the surgeon within the range of values permitted defined by the manufacturer, A second set of surgical variables linked with a second field of interest; where for each surgical variable from the second set of surgical variables, there exists a range of acceptable values ideally defined by the surgeon within the range of values permitted defined by the manufacturer, A third set of surgical variables linked with a third field of interest; where for each surgical variable from the third set of surgical variables, there exists a range of acceptable value ideally defined by the surgeon within the range of values permitted defined by the manufacturer, or More generally, a "n" set of surgical variables linked with a "n" field of interest; where for each surgical variable from the "n" set of surgical variables, there exists a range of acceptable value ideally defined by the surgeon within the range of values permitted defined by the manufacturer.

It should be noted that the set of surgical variables may be linked to a field of interest, such that there may exist some level of interdependency where a given surgical variable may be linked with several fields of interest. For example, the orientation of a cut as a surgical variable may impact both the alignment and the soft-tissue tension, i.e., two distinct fields of interest.

In some embodiments, at least one of the following sets of patient-specific functional parameters (FP) associated with a field of interest may include:

A first set of functional parameters linked with a first field of interest; where for each functional parameter from the first set of functional parameters, there exists a range of target values ideally defined by the surgeon within the range of values permitted defined by the manufacturer, A second set of functional parameters linked with a second field of interest; where for each functional parameter from the second set of functional parameters, there exists a range of target values ideally defined by the surgeon within the range of values permitted defined by the manufacturer, A third set of functional parameters linked with a third field of interest; where for each functional parameter from the third set of functional parameters, there exists a range of target values ideally defined by the surgeon within the range of values permitted defined by the manufacturer, or.

More generally, a "n" set of functional parameters linked with a "n" field of interest; where for each functional parameter from the "n" set of functional parameters, there exists a range of targeted value ideally defined by the surgeon within the range of values permitted defined by the manufacturer.

In some embodiments, the system may leverage an optional healthcare-based set of input that may include at least one of the following data:

A Payer coverage type,

A Hospital or outpatient surgery center, or

A Rehabilitation type.

In at least one aspect of at least one embodiment disclosed herein, at least one algorithm used therein may generate a personalized surgical planning for considering functional parameters as the targeted goals to be achieved as an output through the processing of the surgical variables applied to the patient-based set of inputs. Also, because there exists a high likelihood that all of the functional parameters may not be simultaneously achieved, weights between the different fields of interest may be assigned, and the fields of interest may be ranked according to an order of importance.

In some embodiments, at least some embodiments disclosed herein further define the setup of weights for one or more algorithms, including without limitation machine learning-based algorithms, and their impact on the definition of the surgical planning.

In some embodiments, the weight approach may facilitate the possibility of emphasizing certain field of interest(s) (e.g., alignment, size, joint laxity, or resection thickness, or any combination thereof) based on the surgical workflow selected by a surgeon and/or by patient-based criteria and/or by any other input.

In some embodiments, the weight of each field of interest and subsequently each functional parameter may be determined by a number of approaches.

In some embodiments, a weight-based implant algorithmic model, a weight-based implant (trained) machine learning model, or both, may determine weights objectively or be used in a combination with ranking between them by order of importance (e.g., #1, #2, #3, . . . ), and/or being expressed from a subjective perspective (e.g., high, medium, low). This ranking or prioritization may also be referred to herein as patient-specific functional parameter prioritization.

In some embodiments, the weight-based implant algorithmic model, the weight-based implant (trained) machine learning model, or both, may be configured to rank each functional parameter based on weights according to the workflow. For example, for a total knee arthroplasty (TKA) based on mechanical alignment, the weight-based implant algorithmic model, the weight-based implant (trained) machine learning model, or both, may be configured to prioritize alignment-based parameters are over laxity-based parameters and size-based parameters. Similarly, for a total knee arthroplasty (TKA) based on functional alignment, the weight-based implant algorithmic model, the weight-based implant (trained) machine learning model, or both, may be configured to prioritize laxity-based parameters over alignment-based parameters and size-based parameters.

In some embodiments, the surgical procedure (not limited to knee joint surgical procedures) may incorporate at least one type of joint alignment procedure, and the at least one weight-based implant algorithm, the at least one weight-based implant machine learning model, or both, may be configured to output the plurality of weights based at least in part on the at least one type of joint alignment procedure.

In some embodiments, the at least one type of joint alignment procedure is based on at least one of: a mechanical alignment, an anatomical alignment, a kinematic alignment, a restricted kinematic alignment, an inverse kinematic alignment, or a functional alignment.

In some embodiments, when the at least one type of joint alignment procedure is a mechanical alignment, the at least one weight-based implant algorithm, the at least one weight-based implant machine learning model, or both, are configured to output at least one implant alignment weight with a highest weight.

In some embodiments, when the at least one type of joint alignment procedure is a functional alignment, the at least one weight-based implant algorithm, the at least one weight-based implant machine learning model, or both, are configured to output at least one joint laxity weight with a highest weight.

In some embodiments, when the at least one type of joint alignment procedure is a kinematic alignment, the at least one weight-based implant algorithm, the at least one weight-based implant machine learning model, or both, are configured to output at least one implant resection thickness weight with a highest weight.

Figure 6:
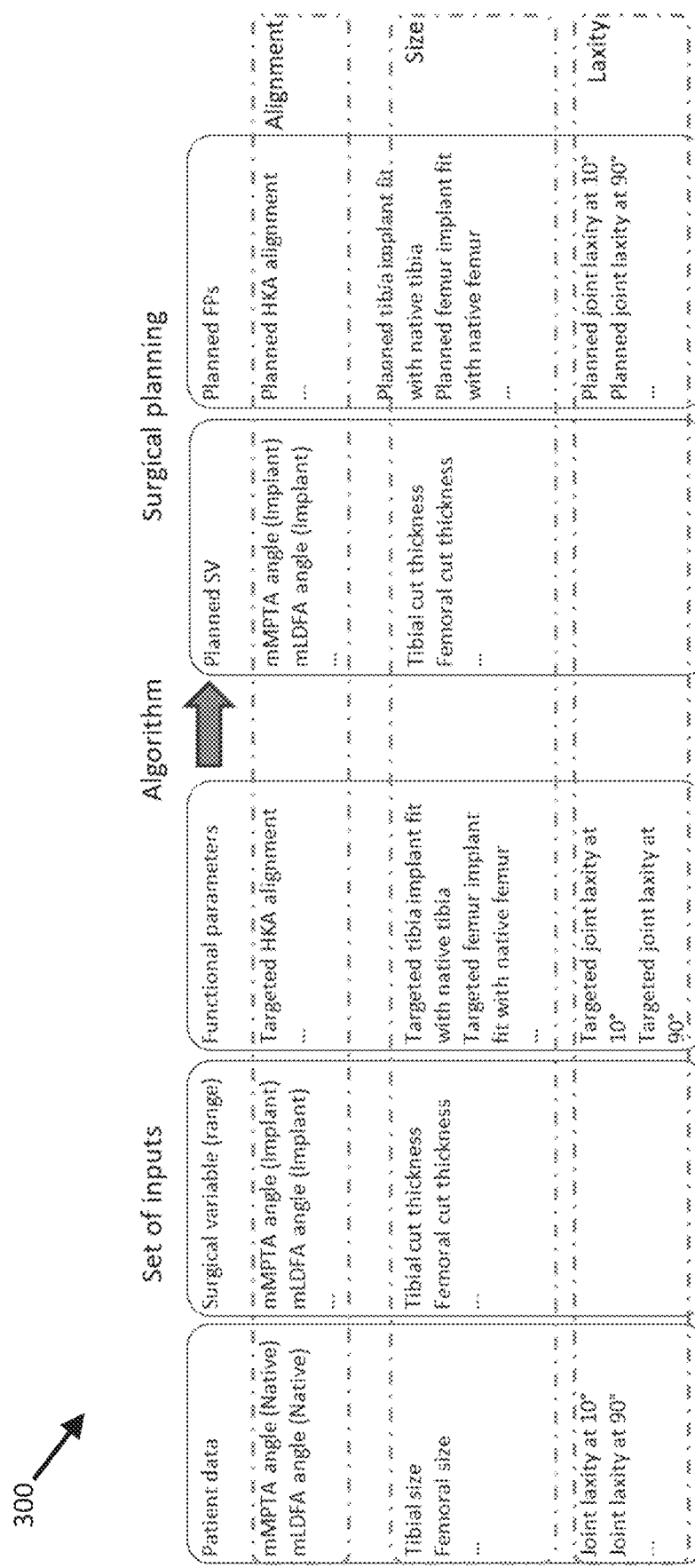
FIG. 6 is a table illustrating data for the set-up of a surgical planning for a TKA considering alignment, size, and joint laxity as fields of interest in accordance with one or more embodiments of the present invention.

FIG. 6 is a table 300 illustrating data for the set-up of a surgical planning for a TKA considering alignment, size, and joint laxity as fields of interest in accordance with one or more embodiments of the present disclosure.

In some embodiments, with regard to FP Weights, consider an exemplary embodiment of a total knee joint replacement for the three fields of interest of alignment, size, and laxity, and corresponding weights for these fields of interest may be denoted as: $w_a, w_s, w_l$ respectively. By assigning these weights, the algorithm may be configured to assign planned surgical variables across a spectrum of all surgical variables to maximize the fulfillment of FPs associated with highly weighted field of interest over those associated with lower weighted field of interest. The maximization of fulfillment may refer to how many FPs of specific field of interest may be fitted closer to their respective targets. In other embodiments, the maximization of fulfillment may refer to how many FPs of specific field of interest may be fitted closer to their respective targets based on the weights. In yet other embodiments, the maximization of fulfillment may refer to how many FPs of specific field of interest may be fitted closer to their respective targets based on a ranking of the weights.

In some embodiments, alignment, size, and laxity FPs may be represented as $(A_1, A_2, \ldots, A_M)$, $(S_1, S_2, \ldots, S_N)$, and $(L_1, L_2, \ldots, L_P)$ respectively. The objective may be to minimize overall global error contributed by FPs from across various fields of interest. In this exemplary embodiment, three fields of interest may be considered: alignment, size, and laxity. The global error function $Err(FP, w_a, w_s, w_l)$ incorporating the weights from alignment ($w_a$), size ($w_s$), and laxity ($w_l$) may be given below:

$$Err(FP, w_a, w_s, w_l) =$$

$$w_a * \frac{\sum_{m=1}^{m=M} err(A_m)}{M} + w_s * \frac{\sum_{n=1}^{n=N} err(S_n)}{N} + w_l * \frac{\sum_{p=1}^{p=P} err(L_p)}{P}$$

$$w_a, w_s, w_l \geq 0$$

$$w_a + w_s + w_l = 1$$

In some embodiments, each $err(FP_i)$ may denote an error penalty function designed to ensure that the fitted FPs may remain within specified thresholds. A custom piecewise linear penalty function that imposes constraints to keep each FP ($FP_i$) within its target and acceptable thresholds. The linear penalty function for FP x may be given below as:

$$err(x) = \begin{bmatrix} 0 & \text{if } FP_T^{min} \leq x \leq FP_T^{max} \\ sf * |x - FP_T^{min}| & \text{if } FP_A^{min} \leq x < FP_T^{min} \\ sf * |FP_T^{min} - x| & \text{if } FP_T^{max} < x \leq FP_A^{max} \\ |x - FP_A^{min}| + sf * |FP_T^{min} - FP_A^{min}| & \text{if } x < FP_A^{min} \\ |FP_A^{max} - x| + sf * |FP_A^{max} - FP_T^{max}| & \text{if } x > FP_A^{max} \end{bmatrix}$$

Here $$FP_T^{min}, FP_T^{max}, FP_A^{min}, \text{ and } FP_A^{max}$$

may represent the minimum target threshold, maximum target threshold, minimum acceptable threshold, and maximum acceptable threshold, respectively. The scaling factor, denoted as sf, may adjust the penalty magnitude. The penalty function values may increase as the FP deviates from these thresholds, thereby encouraging the implant fitting method to fit FPs within the specific thresholds.

In some embodiments, alternative error penalty functions such as quadratic, cubic, exponential, and sigmoid functions, may be applied instead of linear penalty function to change error penalty rate from linearity as FPs deviate from acceptable thresholds.

Figure 7:
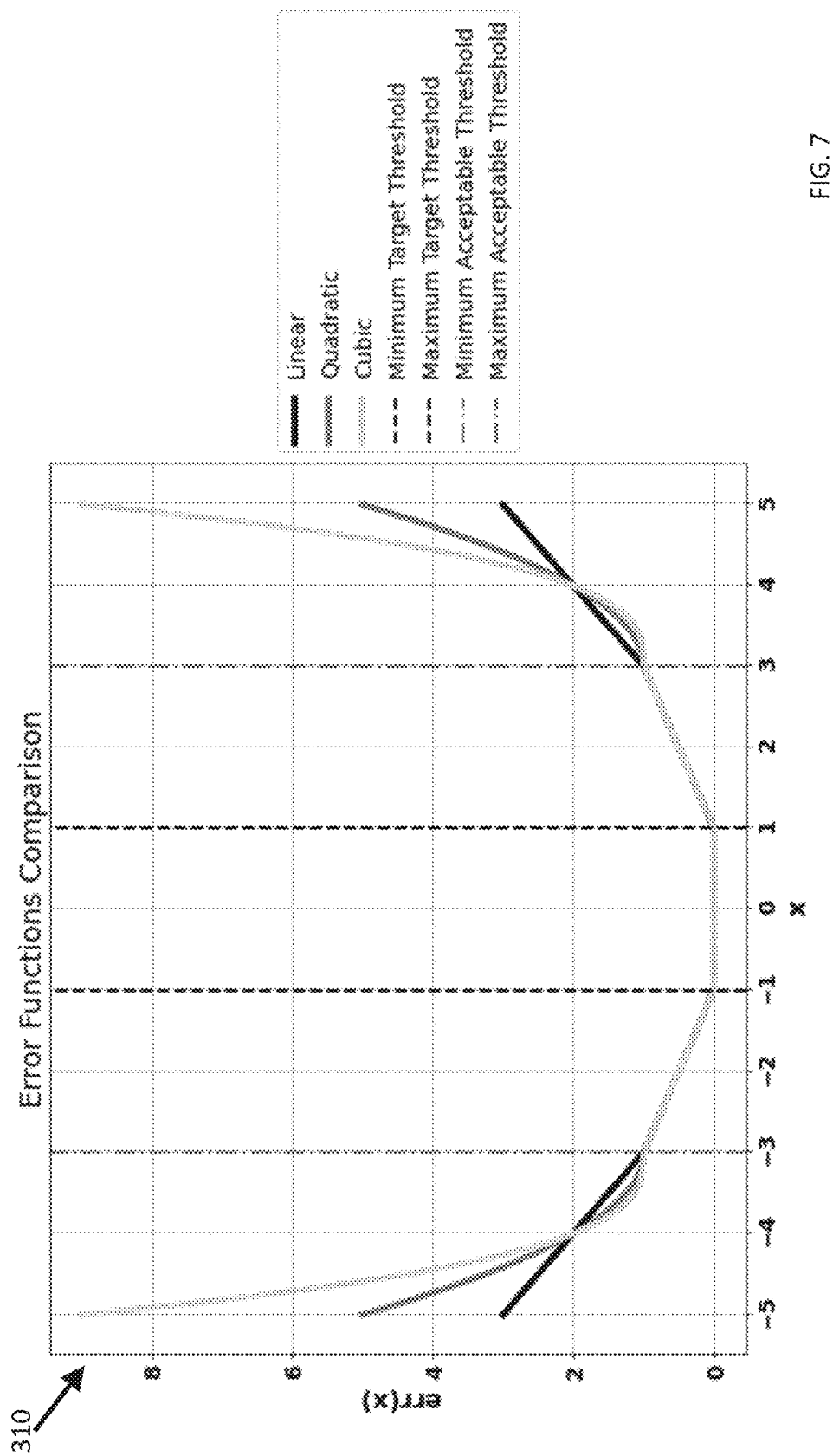
FIG. 7 illustrates a graph of three error functions in accordance with one or more embodiments of the present invention.

FIG. 7 illustrates a graph 310 of three error functions in accordance with one or more embodiments of the present disclosure. FIG. 7 further illustrates the effects of linear, quadratic, and cubic penalty functions for $$FP_T^{min} = -1, FP_T^{max} = 1, FP_A^{min} = -3, FP_A^{max} = 3, sf = 0.5.$$

functions are applied outside the acceptable thresholds to illustrate how much the error penalty increases from changing penalty function from linear to cubic. The error penalty functions may be fined tuned based on the data and implant fitting models available for each surgeon.

In some embodiments, the optimization process may aim to minimize global error function $Err(FP, w_a, w_s, w_l)$, and to determine optimal weights $w_a, w_s, w_l$ based on the data. The optimization algorithm may adjust weights by assigning lower weights to fields of interest with higher FP errors and higher weights to field of interest with lower FP errors. In this way, higher weights may imply a narrower range for their corresponding FPs, while those with lower weights may imply a broader range. An example for optimization algorithm training to determine optimal weights may be provided in surgeon specific functional parameters optimization model (FPOM) section hereinbelow.

In some embodiments, the fields of interest may be ranked based on a magnitude of their weights with priority given to those fields of interest with the highest weight. Functional parameters associated with highly weighted fields may be better fulfilled than those FPs in subsequent fields of interest based on their rank. For example, in a case where $w_a=0.7$, $w_s=0.1$, $w_l=0.2$, this implies that the rank of fields of interest from highest to lowest importance may be alignment>laxity>size. Alignment FPs may be better fulfilled than those of laxity FPs planning, and then size FPs planning.

Figure 8:
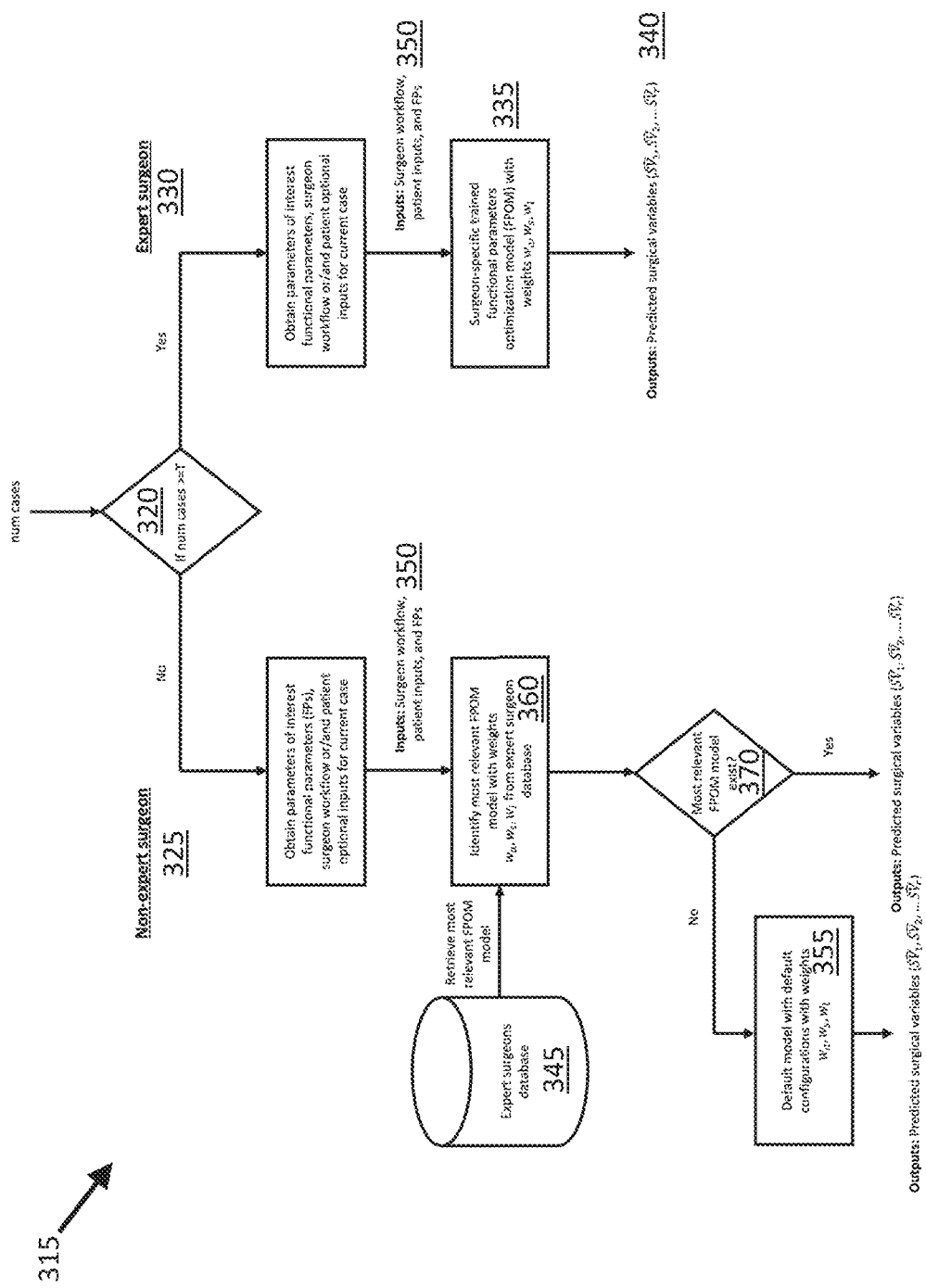
FIG. 8 illustrates a functional parameters (FP) workflow for expert surgeons and non-expert surgeons in accordance with one or more embodiments of the present invention.

FIG. 8 illustrates a functional parameters (FP) workflow for expert surgeons and non-expert surgeons in accordance with one or more embodiments of the present disclosure. Here, "expert" may relate to a clinical experience of a surgeon (i.e., the number of cases previously performed by the surgeon).

In some embodiments, FIG. 8 illustrates a workflow 315 for obtaining weights $w_a, w_s, w_l$ for three fields of interest alignment, size, laxity, and/or resection thickness as personalized to surgeon's requirements for a specific surgery case. Inputs 350 may be from multiple resources such as for example but not limited to:

Functional parameters (FPs): FPs associated with fields of interest specific to surgeon such as alignment, size, laxity, and/or resection thickness.

Surgeon workflow (SW) category: For example, for TKA, there may be numerous combinations of workflow based on the order of the bone cuts (i.e., tibia first, or femur first) and the alignment techniques (i.e., mechanical alignment, kinematic alignment, functional alignment, . . . ).

Patient inputs: demographics, geographical area, activity, deformity category, etc.

In some embodiments, the workflow 315 may start with a checking 320 of number of previous cases (num cases) available for surgeon. A predefined threshold T, representing the minimum number of cases, may be utilized to classify expert surgeons 330 and non-expert surgeons 325.

In some embodiments, for expert surgeons 330, trained surgeon-specific FPOM with optimal weights $w_a, w_s, w_l$ 335 may be used to predict surgical variables 340 for a specific case.

In some embodiments, for non-expert surgeons 325, a most relevant FPOM model with optimal weights $w_a, w_s, w_l$ may be retrieved from expert surgeon database to predict surgical variables for a specific case. If a model may not be retrieved, default models 355 with predefined weights may be utilized to predict surgical variables.

Note that in the context of this disclosure, a model may be relevant when it has been trained using data that matches or closely aligns with the combination of inputs provided for the current use case, thereby increasing the likelihood that the model's output (e.g., weighting recommendations) may be applicable and/or beneficial for the intended surgical planning.

In some embodiments, model relevance may be determined based on matching attributes directly (e.g., same surgical workflow) or through similarity measures computed via clustering techniques when multiple inputs may be involved. In use case scenarios where partial matches may exist, the relevance may be graded based on the extent of input overlap and proximity within a clustering hierarchy.

In some embodiments, if a minimum number of cases condition 320 is not met (e.g., for non-expert surgeon 325), one or more inputs described hereinabove may be utilized to search an expert surgeon database 345 to retrieve most relevant model 360 for a specific case for non-expert surgeon. Exemplary examples may include, but are not limited to a case where only a Surgeon workflow (SW) may be available (e.g., TKA, tibia first, mechanical alignment), then a search attribute SW may be used to retrieve the model.

Note: It may be possible to retrieve models from input size ranging from 1 to I, where I is a maximum size of the inputs available.

If a relevant model is not retrieved, default configurations setup 355 based on the surgeon philosophy may be utilized. If the surgeon, for example, may be more focused on alignment and size, and does not care about laxity, more weight may be assigned to alignment and size, and zero weight to laxity.

In some embodiments, if a minimum number of cases condition 320 is met (e.g., for an expert surgeon), all the available inputs from the aforementioned input sources may be gathered. These inputs may be provided to a surgeon specific trained FPOM model 335 with optimal weights to predict surgical variables 340.

In some embodiments, multiple models for expert surgeon may be based on several factors such as number of inputs, amount of training data, fields of interest, and other attributes such as for example, but not limited to:

Inputs: Different models may be trained and tested for various combinations of inputs. For example, there may be a model based solely on patient deformity, another based on SW combined with patient inputs, and another based on specific FPs of interest.

Amount of training data: models may be built or updated based on the amount of training data. One model might be trained using all available cases, while another could be built exclusively on the latest cases, ensuring that the latest surgeon planning changes may be captured in this model.

Field of interest: multiple models may be trained based on different fields of interest for same surgeon. For instance, one model might prioritize alignment as the primary field of interest focusing on cases where alignment goals have given preference, while another model might emphasize laxity.

In some embodiments, the weight-based implant algorithm, the weight-based implant machine learning model, or both, may be generated based at least in part on surgeon-specific data stored in an expert surgeon database. The surgeon-specific data may be based on input combinations (workflow, patient factors, etc.), an amount of training data (e.g., all past cases, last N cases, first M cases), and/or one or more field of interest preference(s) (e.g., alignment vs. laxity focus).

In some embodiments, the plurality of weights outputted from the weight-based implant algorithm, the weight-based implant machine learning model, or both for a surgical procedure performed by at least one expert surgeon may be trained with surgeon-specific data from past personalized cases of the at least one expert surgeon.

In some embodiments, the plurality of weights outputted from the weight-based implant algorithm, the weight-based implant machine learning model, or both for a surgical procedure performed by at least one non-expert junior surgeon may be trained from generalized models based on surgical workflow relevance, patient-specific inputs, etc.

FIG. 9 illustrates an FPOM algorithm training using batch gradient descent optimization pseudo code 375 that considers three fields of interest of alignment, size, and laxity in accordance with one or more embodiments of the present disclosure. The training and testing (model evaluation) process is discussed below in FIG. 10. The training process and FPOM algorithm is further discussed hereinbelow.

In some embodiments, other optimization methods may be used to determine optimal weights such as for example, but not limited to mini-batch gradient descent, stochastic gradient descent, adaptive gradient algorithm (Adagrad), Root Mean Square Propagation (RMSprop), etc.

In some embodiments, with regard to a surgeon specific FPOM algorithm, the FPOM algorithm training pseudo code may be provided in FIG. 9. FPOM may be trained using expert surgeon data as mentioned hereinabove. The objective of FPOM training may be to determine the best weights based on training data and available inputs as follows:

Training dataset may include data from t cases.

For each training case, an implant fit method may calculate all possible implant positions to compute fitted FPs, so as to ensure that each FP meets acceptable and target thresholds. The optimal planning may then be selected from the space of all available fits to minimize global error for each case.

This process may be repeated to compute the global error for all training cases. An overall global error may be calculated by computing the average.

An optimization method such as for example, batch gradient descent may be applied to calculate optimal weights based on all training samples.

Note that the FPOM model may be used interchangeably with the term weight-based implant algorithm.

In some embodiments, the weight-based implant algorithm configured to output a plurality of weights may be implemented as a machine learning model and referred to herein as a weight-based implant machine learning model.

Figure 10:
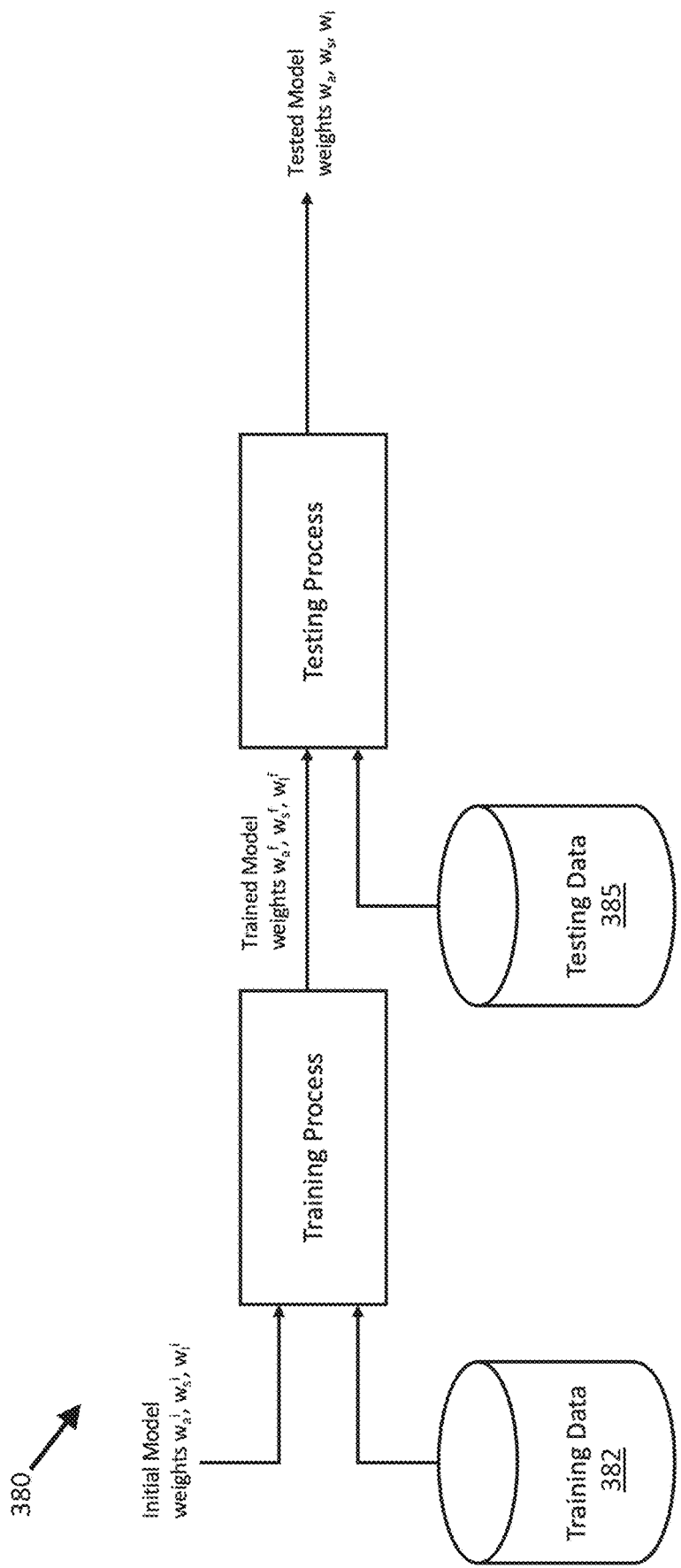
FIG. 10 is a block diagram showing a training and model evaluation of FPOM models in accordance with one or more embodiments of the present invention.

FIG. 10 is a block diagram 600 showing a training and model evaluation of FPOM models in accordance with one or more embodiments of the present disclosure. With regard to FPOM training and evaluation, the training and model evaluation (testing) of FPOM model may be provided in FIG. 10, but the training and testing error metric may be the same as that provided in FIG. 9. For T cases available for an expert surgeon, the dataset may be randomly split into training data 382 and testing data 385 respectively training size (t) and testing size (T−t). The training test split percentage ratio could be 80/20, or 90/10, for example, depending on the availability of the dataset.

In some embodiments, multiple modes of realization based on weights may be allocated to n fields of interest. Using an exemplary embodiment, an evaluation was performed to determine how an alternate mode (e.g., laxity-based planning) may compare to common default mode (e.g., alignment-based planning), which may aid some surgeons in planning.

In some embodiments, to test these modes of realization, a dataset, that may include 313 total knee arthroplasty (TKA) cases, for example, performed by 6 surgeons using a full gap balancing technique, may be utilized. Two modes may be established for comparison: a) prioritizing alignment and size with lower emphasis on laxity, characterized by higher weights for alignment and size and lower weights on laxity, and b) conversely, higher weights for laxity and size with lower weight for alignment. These two modes may be referred to as a historical algorithm and a laxity-based algorithm for the scope of this disclosure.

In some embodiments, for each case, after the acquisition of the joint gaps throughout the arc of motion under a force-controlled environment, an algorithm outputted a preliminary femoral surgical planning (initial planning), which may be subsequently personalized by the surgeon (final planning).

In some embodiments, for each algorithm, the combined number of adjustments clicks for each of the 9 cut parameters needed to transition from the initial planning proposed by each algorithm to the final planning stage as validated by the surgeon may be calculated. Here, adjustment clicks may represent number of screen interactions by surgeon, indicating a 1 mm/1 deg change.

In some embodiments, a surgical planning algorithm may be used to improve the setup of such planning. In this regard, a study reviewed technical logs from 313 TKA cases performed by 6 individual surgeons using a full gap-balancing technique. For each case, after the acquisition of the joint gaps throughout the arc of motion under a force-controlled environment, an algorithm was used to generate a preliminary femoral surgical planning (initial planning); which was subsequently personalized by the surgeon (final planning). Two distinct algorithms for the set-up of the initial planning were considered: (1) an historical algorithm solely based on alignment and size considerations and (2) a laxity-based algorithm solely based on soft-tissue and size considerations. For each algorithm, the combined number of adjustment clicks for each of the 9 cut parameters needed to transition from the initial planning proposed by each algorithm to the final planning validated by the surgeon may be calculated. Adjustment clicks may represent number of screen interactions by the surgeon, indicating a 1 mm/1 deg change.

Although the algorithmic flows described hereinabove may refer to the three fields of interest of alignment, size, and laxity, this is not by way of limitation of the embodiments disclosed herein. Any number of fields of interest may be included in the algorithmic flows. For example, an implant resection thickness and its corresponding weight may be another field of interest that may be included the algorithmic flows and weight prioritization as described herein. Thus, the at least one weight-based implant algorithm, at least one weight-based implant machine learning model, or both may be configured to output the plurality of weights that may include at least one of: at least one implant alignment weight for at least one implant alignment functional parameter of the plurality of patient-specific functional parameters, at least one implant size weight for at least one implant size functional parameter of the plurality of patient-specific functional parameters, at least one joint laxity weight for at least one joint laxity functional parameter of the plurality of patient-specific functional parameters, at least one implant resection thickness weight for at least one implant resection thickness functional parameter of the plurality of patient-specific functional parameters, or any combination thereof.

Note that in the context of this disclosure, the definition of "size" may be the overall fit between the implant and the bone, which therefore may encompass the dimensional considerations such as (1) resection thickness of the different bone cuts (e.g., proximal tibial cut, distal femoral cut, posterior condyles cut), (2) antero-posterior fit of the implant relative to the bone member, (3) medio-lateral fit of the implant relative to the bone member, or (4) any other linear dimension commonly expressed in millimeter or inch.

FIGS. 11A-11C are tables 390 illustrating the difference in the number of adjustment clicks needed by the surgeon when employing a historical algorithm versus a laxity-based planning algorithm in accordance with one or more embodiments of the present disclosure. Specifically, the number of adjustments clicks for the 6 surgeons and the 9 cut parameters computed with the historical algorithm are shown in FIG. 11A and computed with the laxity-based planning algorithm are shown in FIG. 11B. FIG. 11C shows the percentage (%) reduction of adjustment clicks. The laxity-based planning significantly improved the initial planning definition with mean adjustment clicks reduction of 38.5% (range 18.7%-70.2%) from 12.93 clicks (range 8.57-18.62) with the historical algorithm to 7.95 clicks (range 5.54-10.0) with the laxity-based algorithm. This analysis may indicate that utilizing an alternative mode of realization, e.g., laxity-based planning, which gives higher weight to laxity, may be favorable for some surgeons when compared to the historical approach, which prioritizes alignment.

Historically, TKA techniques may be systematic and heavily based on pre-defined alignment targets. As a result, the corresponding planning algorithms may be equally focused on alignment considerations. Based on the recognized importance of optimizing soft-tissue balance during TKA, surgeons may aim to target patient-centric surgical plans. This study may exemplify the potential of laxity-based planning to support the surgeon in delivering personalized TKA.

While the present disclosure leverages the total knee joint where the algorithm may be leveraged for the set-up of the femoral surgical planning, the approach may be declined to other partial or total joint applications as well as other surgical workflows.

In some embodiments, the joint under consideration may be described as any joint that may include at least a first bone member and at least a second bone member such as, but not limited to the elbow joint, the shoulder joint, the hip joint, the knee joint, and/or the ankle joint. It should be noted some of these joints may include three bone members. For example, the elbow joint is made up of the humerus on the proximal aspect and both the ulna and the radius on the distal aspect. Also, some of these joints may include sub-joints. For example, the knee joint may include both the tibiofemoral joint between the femur (thigh bone) and the tibia (shin bone) as well as the patellofemoral joint between the patella (knee cap) and the femur (thigh bone).

Also, the algorithms described herein may be applied to both partial or total arthroplasty of the joint. Partial arthroplasty may relate to the replacement/resurfacing of a partial aspect of the joint, whereas total arthroplasty may relate to the replacement/resurfacing of the entire joint. For example, partial knee arthroplasty (PKA) or unicompartmental knee arthroplasty (UKA) may relate to the resurfacing of only one compartment (i.e., medial or lateral) of the knee joint, whereas total knee arthroplasty (TKA) may relate to the simultaneous resurfacing of both compartments (i.e., medial and lateral) of the knee joint.

In some embodiments, the algorithms described herein may be applied to hemiarthroplasty indication; where one bone member of the considered joint may be replaced/resurfaced. For example, hemiarthroplasty of the shoulder joint may relate to an instance where the humeral head may be replaced/resurfaced; while the native glenoid may be maintained as-is.

Finally, depending on the surgical workflow, the algorithms described herein may be applied to one bone member, or at least two bone members. For example, in some embodiments, at the time of the surgery, the surgeon may acquire a first set of patient-specific data (e.g., anatomical landmarks, laxity of the joint), prepare a first bone member, acquire a second set of patient-specific data, and leverage these sets of data as inputs for the algorithms to offer a surgical planning for the preparation of the at least second bone member. In other embodiments, at the time of the surgery, the surgeon may acquire a set of patient-specific data (e.g., anatomical landmarks, laxity of the joint) and leverage this set of data as inputs for the algorithms to provide a surgical planning for the preparation of the at least two bone members. It should be noted that these embodiments may be combined where at the time of the surgery, the surgeon may acquire a set of patient-specific data (e.g., anatomical landmarks, laxity of the joint), leverage this set of data as inputs for the algorithms described hereinabove so as to provide a surgical planning for the preparation of the at least two bone members, prepare a first bone member, acquire a second set of patient-specific data, and leverage this second set of data as inputs to refine the initially proposed surgical planning for the preparation of the at least second bone member.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD, NetBSD, OpenBSD; (2) Linux; (3) Microsoft Windows; (4) OS X (MacOS); (5) MacOS 11; (6) Solaris; (7) Android; (8) iOS; (9) Embedded Linux; (10) Tizen; (11) WebOS; (12) IBM i; (13) IBM AIX; (14) Binary Runtime Environment for Wireless (BREW); (15) Cocoa (API); (16) Cocoa Touch; (17) Java Platforms; (18) JavaFX; (19) JavaFX Mobile; (20) Microsoft DirectX; (21) .NET Framework; (22) Silverlight; (23) Open Web Platform; (24) Oracle Database; (25) Qt; (26) Eclipse Rich Client Platform; (27) SAP NetWeaver; (28) Smartface; and/or (29) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

Figure 12:
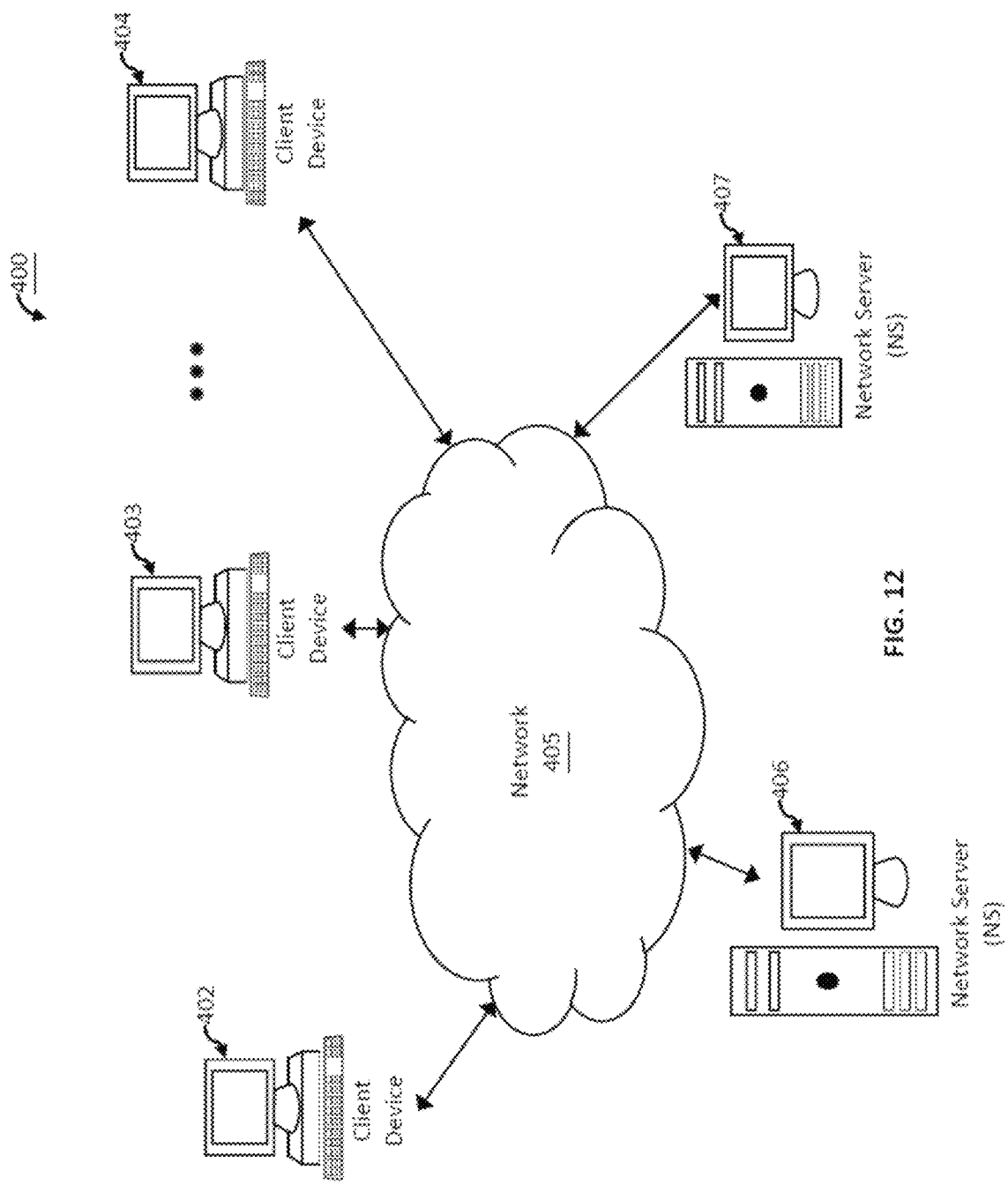
FIG. 12 depicts a block diagram of an exemplary computer-based system/platform in accordance with one or more embodiments of the present disclosure.

FIG. 12 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to manage a large number of members and/or concurrent transactions, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 12, members 402-404 (e.g., clients) of the exemplary computer-based system/platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may run one or more applications, such as Internet browsers, mobile applications, voice calls, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 12, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 13:
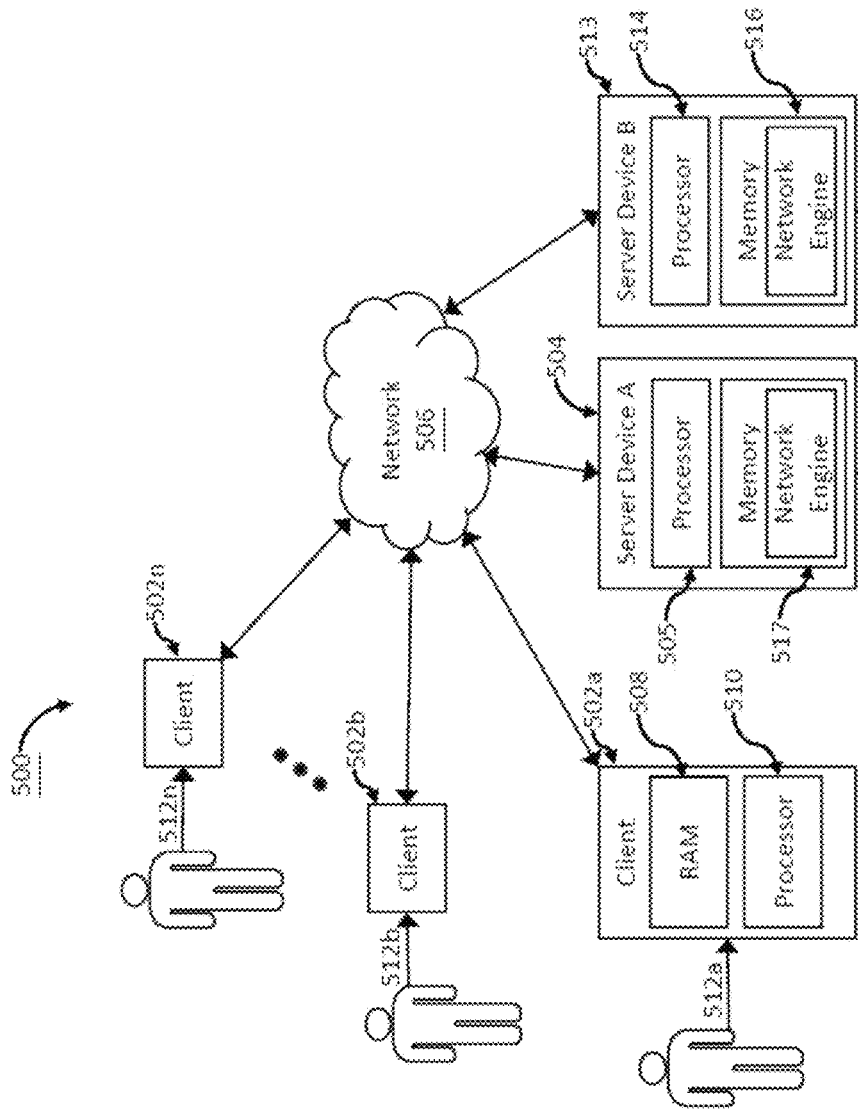
FIG. 13 depicts a block diagram of another exemplary computer-based system/platform in accordance with one or more embodiments of the present disclosure.

FIG. 13 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, a speaker, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™ Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, users, 512a through 512n, may communicate over the exemplary network 506 with each other and/or with other systems and/or devices coupled to the network 506. As shown in FIG. 10, exemplary server devices 504 and 513 may be also coupled to the network 506. In some embodiments, one or more member computing devices 502a through 502n may be mobile clients.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 14:
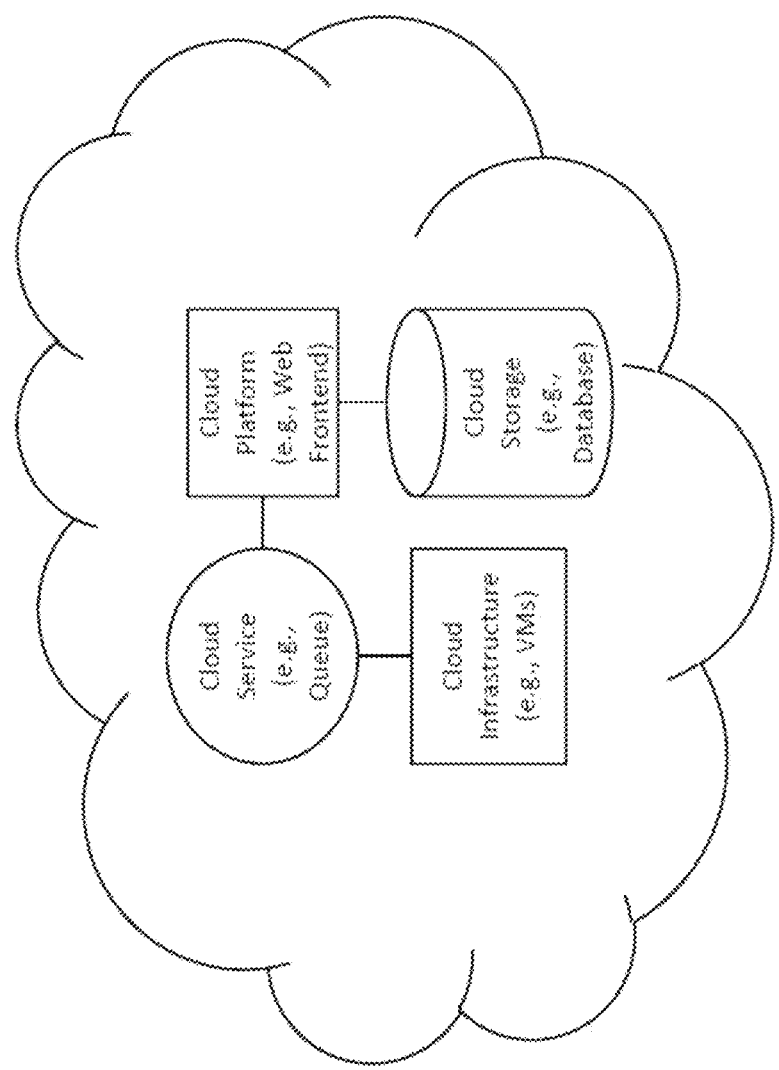
FIGS. 14 and 15 are diagrams illustrating implementations of cloud computing architecture/aspects with respect to which the disclosed technology may be specifically configured to operate, in accordance with one or more embodiments of the present disclosure.
Figure 15:
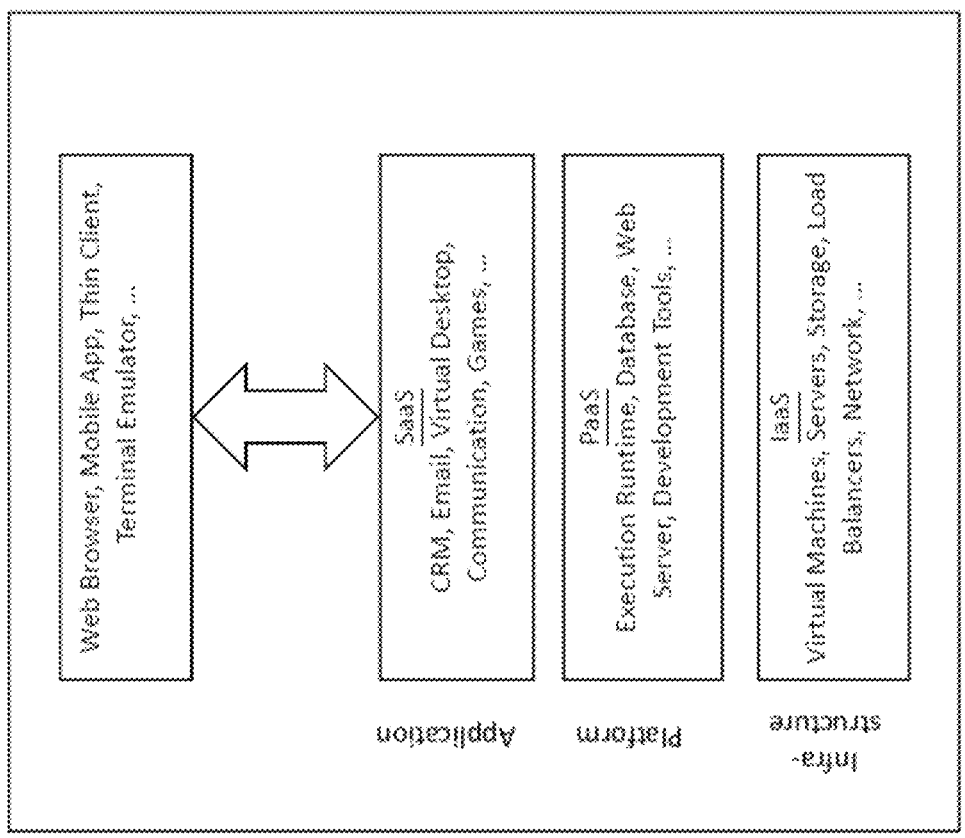

In some embodiments, the exemplary inventive computer-based systems/platforms, the exemplary inventive computer-based devices, and/or the exemplary inventive computer-based components of the present disclosure may be specifically configured to operate in an cloud computing/architecture such as, but not limiting to: infrastructure a service (IaaS), platform as a service (PaaS), and/or software as a service (SaaS). FIGS. 14 and 15 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
 i) Define Neural Network architecture/model,
 ii) Transfer the input data to the exemplary neural network model,
 iii) Train the exemplary model incrementally,
 iv) determine the accuracy for a specific number of timesteps,
 v) apply the exemplary trained model to process the newly-received input data,
 vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

Figure 16:
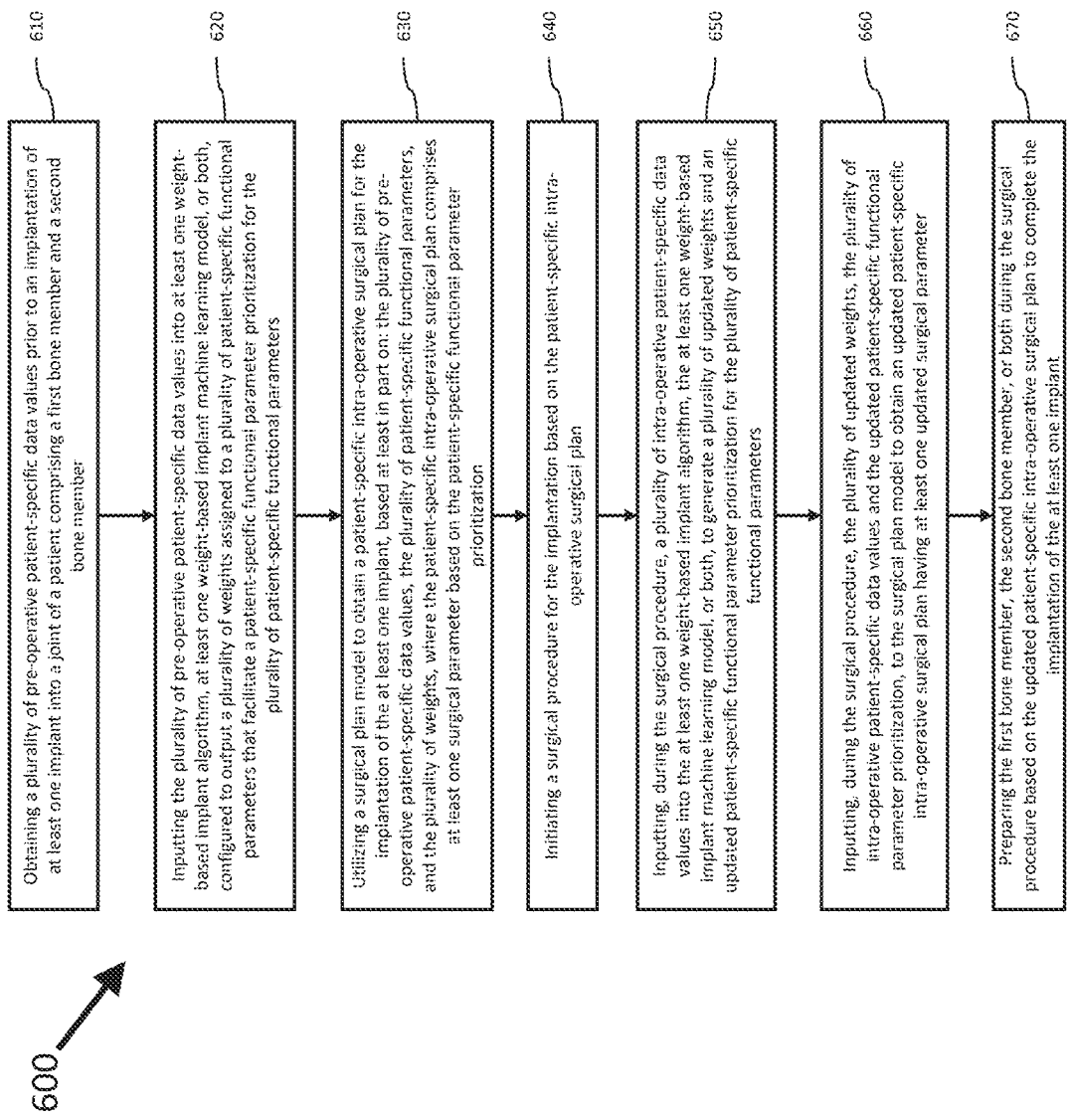
FIG. 16 illustrates a flowchart of a method for implementing a weight-based personalized implant planning during a total joint arthroplasty in accordance with one or more embodiments of the present disclosure.

FIG. 16 illustrates a flowchart of a method 600 for implementing a weight-based personalized implant planning during a total joint arthroplasty in accordance with one or more embodiments of the present disclosure. In some embodiments, the method 600 as a surgical method may be performed in conjunction with a surgeon, a processor or a controller of a robotic surgical apparatus, and/or the processor 70 of the controller 65.

In some embodiments, the method 600 may include obtaining 610 a plurality of pre-operative patient-specific data values prior to an implantation of at least one implant into a joint of a patient comprising a first bone member and a second bone member.

In some embodiments, the method 600 may include inputting 620 the plurality of pre-operative patient-specific data values into at least one weight-based implant algorithm, at least one weight-based implant machine learning model, or both, configured to output a plurality of weights assigned to a plurality of patient-specific functional parameters that facilitate a patient-specific functional parameter prioritization for the plurality of patient-specific functional parameters.

In some embodiments, the method 600 may include utilizing 630 a surgical plan model to obtain a patient-specific intra-operative surgical plan for the implantation of the at least one implant, based at least in part on: the plurality of pre-operative patient-specific data values, the plurality of patient-specific functional parameters, and the plurality of weights, wherein the patient-specific intra-operative surgical plan comprises at least one surgical parameter based on the patient-specific functional parameter prioritization.

In some embodiments, the method 600 may include initiating 640 a surgical procedure for the implantation based on the patient-specific intra-operative surgical plan.

In some embodiments, the method 600 may include inputting 650, during the surgical procedure, a plurality of intra-operative patient-specific data values into the at least one weight-based implant algorithm, the at least one weight-based implant machine learning model, or both, to generate a plurality of updated weights and an updated patient-specific functional parameter prioritization for the plurality of patient-specific functional parameters.

In some embodiments, the method 600 may include inputting 660, during the surgical procedure, the plurality of updated weights, the plurality of intra-operative patient-specific data values and the updated patient-specific functional parameter prioritization, to the surgical plan model to obtain an updated patient-specific intra-operative surgical plan having at least one updated surgical parameter.

In some embodiments, the method 600 may include preparing 670 the first bone member, the second bone member, or both during the surgical procedure based on the updated patient-specific intra-operative surgical plan to complete the implantation of the at least one implant.

In some embodiments, a method may include obtaining a plurality of pre-operative patient-specific data values prior to an implantation of at least one implant into a joint of a patient comprising a first bone member and a second bone member; inputting the plurality of pre-operative patient-specific data values into at least one weight-based implant algorithm, at least one weight-based implant machine learning model, or both, configured to output a plurality of weights assigned to a plurality of patient-specific functional parameters that facilitate a patient-specific functional parameter prioritization for the plurality of patient-specific functional parameters, utilizing a surgical plan model to obtain a patient-specific intra-operative surgical plan for the implantation of the at least one implant, based at least in part on the plurality of pre-operative patient-specific data values, the plurality of patient-specific functional parameters, and the plurality of weights; where the patient-specific intra-operative surgical plan includes at least one surgical parameter based on the patient-specific functional parameter prioritization; initiating a surgical procedure for the implantation based on the patient-specific intra-operative surgical plan; inputting, during the surgical procedure, a plurality of intra-operative patient-specific data values into the at least one weight-based implant algorithm, the at least one weight-based implant machine learning model, or both, to generate a plurality of updated weights and an updated patient-specific functional parameter prioritization for the plurality of patient-specific functional parameters; inputting, during the surgical procedure, the plurality of updated weights, the plurality of intra-operative patient-specific data values and the updated patient-specific functional parameter prioritization, to the surgical plan model to obtain an updated patient-specific intra-operative surgical plan having at least one updated surgical parameter; and preparing the first bone member, the second bone member, or both during the surgical procedure based on the updated patient-specific intra-operative surgical plan to complete the implantation of the at least one implant.

In some embodiments, the plurality of weights may include at least one of: at least one implant alignment weight for at least one implant alignment functional parameter of the plurality of patient-specific functional parameters, at least one implant size weight for at least one implant size functional parameter of the plurality of patient-specific functional parameters, at least one joint laxity weight for at least one joint laxity functional parameter of the plurality of patient-specific functional parameters, at least one implant resection thickness weight for at least one implant resection thickness functional parameter of the plurality of patient-specific functional parameters, or any combination thereof.

In some embodiments, the at least one surgical parameter may be at least one of: at least one surgical cut parameter for the first bone member or the second bone member, or both, at least one implant alignment parameter, at least one implant size parameter, at least one joint laxity parameter, or any combination thereof.

In some embodiments, the plurality of pre-operative patient-specific data values may include data from a plurality of patient-specific inputs, a plurality of surgeon-specific inputs, a plurality of healthcare-specific inputs, or any combination thereof.

In some embodiments, the patient-specific functional parameter prioritization for each of the plurality of patient-specific functional parameters may be based at least in part on at least one target threshold associated with at least one surgeon-specific preference, at least one patient-specific joint deformity metric, at least one patient-specific soft tissue imbalance metric, or any combination thereof.

In some embodiments, the at least one weight-based implant algorithm, the at least one weight-based implant machine learning model, or both, may be configured to output the plurality of weights by an error penalty function configured to minimize deviations from target thresholds and the plurality of patient-specific functional parameters.

In some embodiments, the target thresholds may include at least one of: at least one implant alignment error value for the at least one implant alignment functional parameter, at least one implant size error value for the at least one implant size functional parameter, at least one joint laxity error value for the at least one joint laxity functional parameter, or at least one implant resection thickness error value for at least one implant resection thickness functional parameter.

In some embodiments, the plurality of intra-operative patient-specific data values may include at least one of: at least one tracking data of the first bone member, the second bone member, or both, at least one first laxity measurement based on a gap distance between the first bone member and the second bone member, at least one second laxity measurement based on a differential gap between the first bone member and the second bone member, or at least one real time surgeon-based modification to the at least one surgical parameter during the surgical procedure via a graphical user interface of a surgeon assistance device.

In some embodiments, the method may further include controlling at least one robotic tool for automatically performing the surgical procedure based on the patient-specific intra-operative surgical plan.

In some embodiments, the method may further include generating a patient-specific post-operative dataset of the patient and a plurality of other patients to retrain the at least one weight-based implant algorithm, the at least one weight-based implant machine learning model, or both.

In some embodiments, the method may further include generating a patient-specific post-operative dataset of the patient and a plurality of other patients to retrain the at least one weight-based implant algorithm, the at least one weight-based implant machine learning model, or both, at pre-defined time intervals.

In some embodiments, the patient-specific post-operative dataset may include post-operative patient outcome data, post-operative implant performance data, and/or post-operative surgeon feedback data about the surgical procedure.

In some embodiments, the plurality of weights assigned to the plurality of patient-specific functional parameters may be dynamically adjusted during the surgical procedure based on real-time intra-operative data.

In some embodiments, the at least one weight-based implant algorithm may be configured to prioritize functional parameters by ranking fields of interest in an order of importance based on surgeon-specific preferences and patient-specific needs.

In some embodiments, the joint may be a knee joint.

In some embodiments, the surgical procedure may be a knee arthroplasty such as for example, a total knee arthroplasty (TKA).

In some embodiments, the surgical procedure (not limited to knee joint surgical procedures) may incorporate at least one type of joint alignment procedure, and the at least one weight-based implant algorithm, the at least one weight-based implant machine learning model, or both, may be configured to output the plurality of weights based at least in part on the at least one type of joint alignment procedure.

In some embodiments, the at least one type of joint alignment procedure is based on at least one of: a mechanical alignment, an anatomical alignment, a kinematic alignment, a restricted kinematic alignment, an inverse kinematic alignment, or a functional alignment.

In some embodiments, when the at least one type of joint alignment procedure is a mechanical alignment, the at least one weight-based implant algorithm, the at least one weight-based implant machine learning model, or both, are configured to output at least one implant alignment weight with a highest weight.

In some embodiments, when the at least one type of joint alignment procedure is a functional alignment, the at least one weight-based implant algorithm, the at least one weight-based implant machine learning model, or both, are configured to output at least one joint laxity weight with a highest weight.

In some embodiments, when the at least one type of joint alignment procedure is a kinematic alignment, the at least one weight-based implant algorithm, the at least one weight-based implant machine learning model, or both, are configured to output at least one implant resection thickness weight with a highest weight.

In some embodiments, the patient-specific intra-operative surgical plan may be updated by calculating an error function that incorporates the plurality of weights and deviations of functional parameters from target thresholds.

In some embodiments, the at least one weight-based implant algorithm may be configured to assign weights to the plurality of patient-specific functional parameters using a machine learning model trained on historical surgical data and post-operative outcomes.

In some embodiments, the plurality of intra-operative patient-specific data values may include at least one real-time soft-tissue tension measurement obtained using a distractor.

In some embodiments, the patient-specific intra-operative surgical plan may be displayed on a wearable augmented reality device worn by a surgeon during the surgical procedure.

In some embodiments, the patient-specific intra-operative surgical plan may be displayed on a display of a surgery assistance device during the surgical procedure.

In some embodiments, the at least one weight-based implant algorithm may be configured to assign higher weights to functional parameters associated with fields of interest that exhibit lower error penalties during the surgical procedure.

In some embodiments, the patient-specific intra-operative surgical plan may include at least one recommendation for balancing soft-tissue tension by adjusting surgical cut parameters for the first bone member and the second bone member.

In some embodiments, the method may include assessing that a surgeon performing the surgical procedure is an expert surgeon based a number of surgical procedures previously performed by the surgeon being above a predefined threshold. The at least one weight-based implant algorithm, the at least one weight-based implant machine learning model, or both, may be configured to output the plurality of weights after training with surgeon-specific data associated with the expert surgeon.

In some embodiments, the method may include assessing that a surgeon performing the surgical procedure may be a junior surgeon based a number of surgical procedures previously performed by the surgeon being below a predefined threshold. The at least one weight-based implant algorithm, the at least one weight-based implant machine learning model, or both, may be configured to output the plurality of weights after training with surgeon-specific data from generalized models based on surgical workflow relevance and the plurality of patient-specific data values.

In some embodiments, the method may include generating the at least one weight-based implant algorithm, the at least one weight-based implant machine learning model, or both, that may be configured to output the plurality of weights based at least in part on surgeon-specific data stored in an expert surgeon database.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A method comprising:
obtaining a plurality of patient-specific data values prior to an implantation of at least one implant into a joint of a patient comprising a first bone member and a second bone member;
inputting the plurality of patient-specific data values into at least one weight-based implant algorithm configured to output a plurality of weights assigned to a plurality of patient-specific functional parameters that facilitate a patient-specific functional parameter prioritization for the plurality of patient-specific functional parameters;
utilizing a surgical plan model to obtain a patient-specific intra-operative surgical plan for the implantation of the at least one implant, based at least in part on:
the plurality of patient-specific data values,
the plurality of patient-specific functional parameters, and
the plurality of weights;
wherein the patient-specific intra-operative surgical plan comprises at least one surgical parameter based on the patient-specific functional parameter prioritization;
initiating a surgical procedure for the implantation based on the patient-specific intra-operative surgical plan;
inputting, during the surgical procedure, a plurality of intra-operative patient-specific data values into the at least one weight-based implant algorithm to generate a plurality of updated weights and an updated patient-specific functional parameter prioritization for the plurality of patient-specific functional parameters;
inputting, during the surgical procedure, the plurality of updated weights, the plurality of intra-operative patient-specific data values, and the updated patient-specific functional parameter prioritization to the surgical plan model to obtain an updated patient-specific intra-operative surgical plan having at least one updated surgical parameter; and
preparing the first bone member, the second bone member, or both during the surgical procedure based on the updated patient-specific intra-operative surgical plan to complete the implantation of the at least one implant.

2. The method according to claim 1, wherein the plurality of weights comprises:
at least one implant alignment weight for at least one implant alignment functional parameter of the plurality of patient-specific functional parameters,
at least one implant size weight for at least one implant size functional parameter of the plurality of patient-specific functional parameters, and
at least one joint laxity weight for at least one joint laxity functional parameter of the plurality of patient-specific functional parameters.

3. The method according to claim 1, wherein the at least one surgical parameter is at least one of:
at least one surgical bone cut parameter,
at least one implant alignment parameter,
at least one implant size parameter, and
at least one joint laxity parameter.

4. The method according to claim 1, wherein the plurality of patient-specific data values comprises data from a plurality of patient-specific inputs, a plurality of surgeon-specific inputs, a plurality of healthcare-specific inputs, or any combination thereof.

5. The method according to claim 1, wherein the patient-specific functional parameter prioritization for each of the plurality of patient-specific functional parameters is based at least in part on at least one target threshold associated with:
- at least one surgeon-specific preference,
- at least one patient-specific joint deformity metric, and
- at least one patient-specific soft tissue imbalance metric.

6. The method according to claim 1, wherein the at least one weight-based implant algorithm is configured to output the plurality of weights by an error penalty function configured to minimize deviations from target thresholds and the plurality of patient-specific functional parameters.

7. The method according to claim 6, wherein the target thresholds comprise
- at least one joint laxity error value for at least one joint laxity functional parameter.

8. The method according to claim 1, wherein the plurality of intra-operative patient-specific data values comprises
- at least one first laxity measurement based on a gap distance between the first bone member and the second bone member.

9. The method according to claim 1, further comprising controlling at least one robotic tool for automatically performing the surgical procedure based on the patient-specific intra-operative surgical plan.

10. The method according to claim 1, further comprising generating a patient-specific post-operative dataset of the patient and a plurality of other patients to retrain the at least one weight-based implant algorithm.

11. The method according to claim 10, wherein the patient-specific post-operative dataset comprises post-operative patient outcome data, post-operative implant performance data, or post-operative surgeon feedback data about the surgical procedure.

12. The method according to claim 1, wherein the at least one weight-based implant algorithm is configured to prioritize functional parameters by ranking the plurality of patient-specific functional parameters in an order of importance based on surgeon-specific preferences and patient-specific needs.

13. The method according to claim 1, wherein the joint is a knee joint;
wherein the surgical procedure is a total knee arthroplasty incorporating at least one type of joint alignment procedure; and
wherein the at least one weight-based implant algorithm is configured to output the plurality of weights based at least in part on the at least one type of joint alignment procedure.

14. The method according to claim 13, wherein the at least one type of joint alignment procedure is based on at least one of:
- a mechanical alignment,
- an anatomical alignment,
- a kinematic alignment,
- a restricted kinematic alignment,
- an inverse kinematic alignment, or
- a functional alignment.

15. The method according to claim 13, wherein the at least one type of joint alignment procedure is a mechanical alignment; and
wherein the at least one weight-based implant algorithm is configured to output at least one implant alignment weight with a highest weight.

16. The method according to claim 13, wherein the at least one type of joint alignment procedure is a functional alignment; and
wherein the at least one weight-based implant algorithm is configured to output at least one joint laxity weight with a highest weight.

17. The method according to claim 13, wherein the at least one type of joint alignment procedure is a kinematic alignment; and
wherein the at least one weight-based implant algorithm is configured to output at least one implant resection thickness weight with a highest weight.

18. The method according to claim 1, wherein the patient-specific intra-operative surgical plan is updated by calculating a global error function that incorporates the plurality of weights and deviations of functional parameters from target thresholds.

19. The method according to claim 1, wherein the at least one weight-based implant algorithm is configured to assign weights to the plurality of patient-specific functional parameters using a machine learning model trained on historical surgical data and post-operative outcomes.

20. The method according to claim 1, wherein the plurality of intra-operative patient-specific data values comprises at least one real-time soft-tissue tension measurement obtained using a distractor.

21. The method according to claim 1, wherein the patient-specific intra-operative surgical plan is displayed on a wearable augmented reality device worn by a surgeon during the surgical procedure.

22. The method according to claim 1, wherein the patient-specific intra-operative surgical plan is displayed on a display of a surgery assistance device during the surgical procedure.

23. The method according to claim 1, wherein the at least one weight-based implant algorithm is configured to assign higher weights to functional parameters associated with fields of interest that exhibit lower error penalties during the surgical procedure.

24. The method according to claim 1, wherein the patient-specific intra-operative surgical plan comprises at least one recommendation for balancing soft-tissue tension by adjusting surgical cut parameters for the first bone member and the second bone member.

25. The method according to claim 1, further comprising assessing that a surgeon performing the surgical procedure is an expert surgeon based a number of surgical procedures previously performed by the surgeon being above a predefined threshold; and
wherein the at least one weight-based implant algorithm is configured to output the plurality of weights after training with surgeon-specific data associated with the expert surgeon.

26. The method according to claim 1, further comprising assessing that a surgeon performing the surgical procedure is a junior surgeon based a number of surgical procedures previously performed by the surgeon being below a predefined threshold; and
wherein the at least one weight-based implant algorithm is configured to output the plurality of weights after training with surgeon-specific data from generalized models based on surgical workflow relevance and the plurality of patient-specific data values.

27. The method according to claim 1, further comprising generating the at least one weight-based implant algorithm that is configured to output the plurality of weights based at least in part on surgeon-specific data stored in an expert surgeon database.

* * * * *